(12) United States Patent
Ghim et al.

(10) Patent No.: US 11,466,978 B2
(45) Date of Patent: Oct. 11, 2022

(54) APPARATUS AND METHOD FOR MEASURING THE THICKNESS AND REFRACTIVE INDEX OF MULTILAYER THIN FILMS USING ANGLE-RESOLVED SPECTRAL INTERFERENCE IMAGE ACCORDING TO POLARIZATION

(71) Applicant: Korea Research Institute of Standard and Science, Daejeon (KR)

(72) Inventors: Young-sik Ghim, Sejong (KR); Hyug-gyo Rhee, Daejeon (KR)

(73) Assignee: Korea Research Institute of Standard and Science, Daejeon (KR)

( * ) Notice: Subject to any disclaimer, the term of this patent is extended or adjusted under 35 U.S.C. 154(b) by 96 days.

(21) Appl. No.: 16/645,946

(22) PCT Filed: Jul. 29, 2019

(86) PCT No.: PCT/KR2019/009394
§ 371 (c)(1),
(2) Date: Mar. 10, 2020

(87) PCT Pub. No.: WO2021/020604
PCT Pub. Date: Feb. 4, 2021

(65) Prior Publication Data
US 2022/0003539 A1  Jan. 6, 2022

(51) Int. Cl.
*G01B 9/02* (2022.01)
*G01B 11/06* (2006.01)
(Continued)

(52) U.S. Cl.
CPC ........ *G01B 11/0675* (2013.01); *G01B 9/0201* (2013.01); *G01B 9/02011* (2013.01);
(Continued)

(58) Field of Classification Search
CPC .............. G01B 11/0675; G01B 9/0201; G01B 9/02011; G01B 9/02084; G01B 2290/70; G01N 21/45; G02B 27/283
See application file for complete search history.

(56) References Cited

U.S. PATENT DOCUMENTS 5,042,949 A * 8/1991 Greenberg ......... G01B 11/0675
356/451
2019/0304851 A1 * 10/2019 Smith ................ G01N 21/8851
(Continued)

FOREIGN PATENT DOCUMENTS

JP  H09196630 A  7/1997
JP  2004177133 A  6/2004
(Continued)

OTHER PUBLICATIONS

International Search Report dated Apr. 28, 2020, issued in connection with corresponding PCT Application No. PCT/KR2019/009394.
(Continued)

*Primary Examiner* — Jonathan M Hansen
(74) *Attorney, Agent, or Firm* — Akerman LLP

(57) ABSTRACT

The present invention relates to an apparatus and a method for measuring a thickness and a refractive index of a multilayer thin film using an angle-resolved spectral interference image according to polarization. More specifically, the present invention relates to an apparatus for measuring a thickness and a refractive index of a multilayer thin film using an angle-resolved spectral interference image according to polarization in an apparatus for measuring a thickness and a refractive index of a measurement object coated with the multilayer thin film, the apparatus including: an illumination optical module having a light source emitting light; a first beam splitter configured to reflect some of the light
(Continued)

emitted from the illumination optical module; an objective lens configured to input some of the light reflected from the first beam splitter to the measurement object constituted by the multilayer thin film and reflect the remaining light to a reference plane to form interference light on a back focal plane; a second beam splitter in which interference light where the reflected light incident and reflected to the measurement object interferes with the reflected light reflected from the reference plane is incident, wherein some of the interference light is reflected and the remaining interference light is transmitted; a first angle-resolved spectral image acquiring unit configured to receive interference light reflected from the second beam splitter and first-polarize the interference light located in the back focal plane of the objective lens to acquire a first polarized interference image; and a second angle-resolved spectral image acquiring unit configured to receive interference light transmitted from the second beam splitter and second-polarize the interference light located in the back focal plane of the objective lens to acquire a second polarized interference image.

13 Claims, 22 Drawing Sheets

(51) Int. Cl.
*G01B 9/02001* (2022.01)
*G01N 21/45* (2006.01)
*G02B 27/28* (2006.01)

(52) U.S. Cl.
CPC ......... *G01B 9/02084* (2013.01); *G01N 21/45* (2013.01); *G02B 27/283* (2013.01); *G01B 2290/70* (2013.01)

(56) References Cited

U.S. PATENT DOCUMENTS

| | | | |
|---|---|---|---|
| 2020/0191657 A1* | 6/2020 | Zawaideh | G01J 3/447 |
| 2021/0341283 A1* | 11/2021 | Ghim | G01N 21/55 |

FOREIGN PATENT DOCUMENTS

| | | |
|---|---|---|
| KR | 20130035464 A | 4/2013 |
| KR | 20130039005 A | 4/2013 |
| KR | 20130084718 A | 7/2013 |
| KR | 101394058 B1 | 5/2014 |
| KR | 101436745 B1 | 9/2014 |
| KR | 20170142240 A | 12/2017 |
| KR | 10-2015216 B1 | 8/2019 |

OTHER PUBLICATIONS

Written Opinion of the International Searching Authority dated Apr. 28, 2020, issued in connection with corresponding PCT Application No. PCT/KR2019/009394.

* cited by examiner

[FIG. 1]
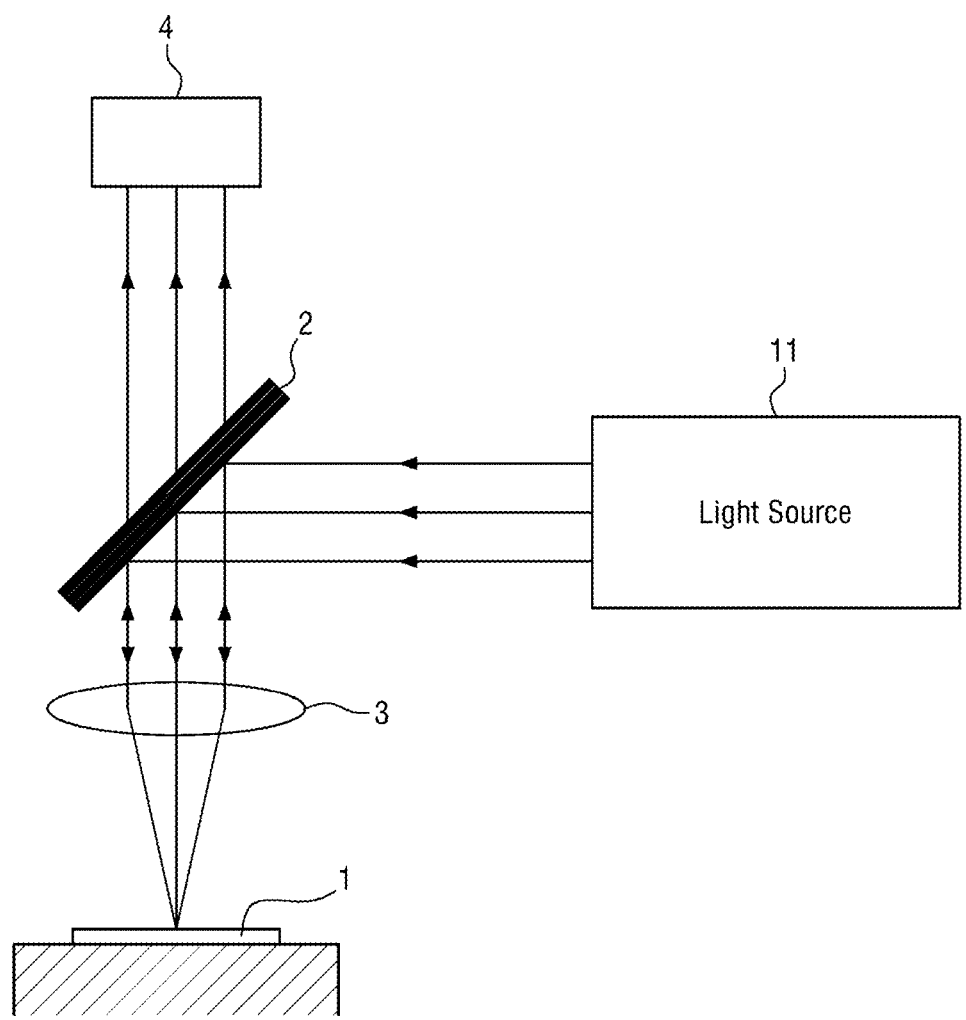

[FIG. 2]
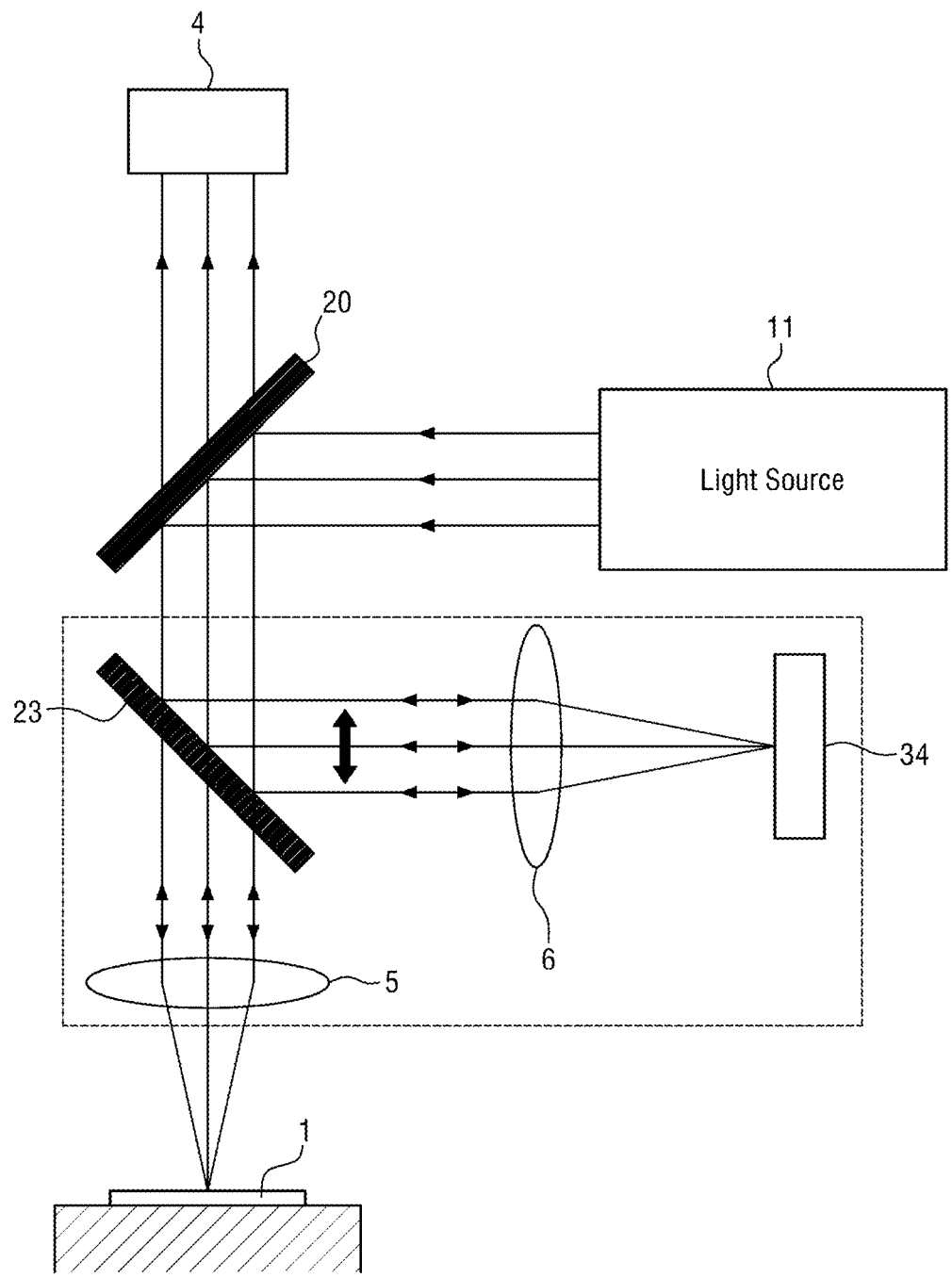

[FIG. 3]
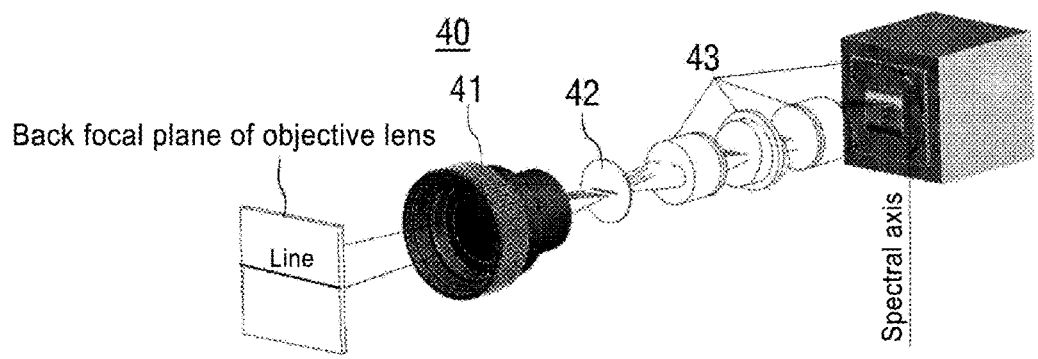
[FIG. 4]
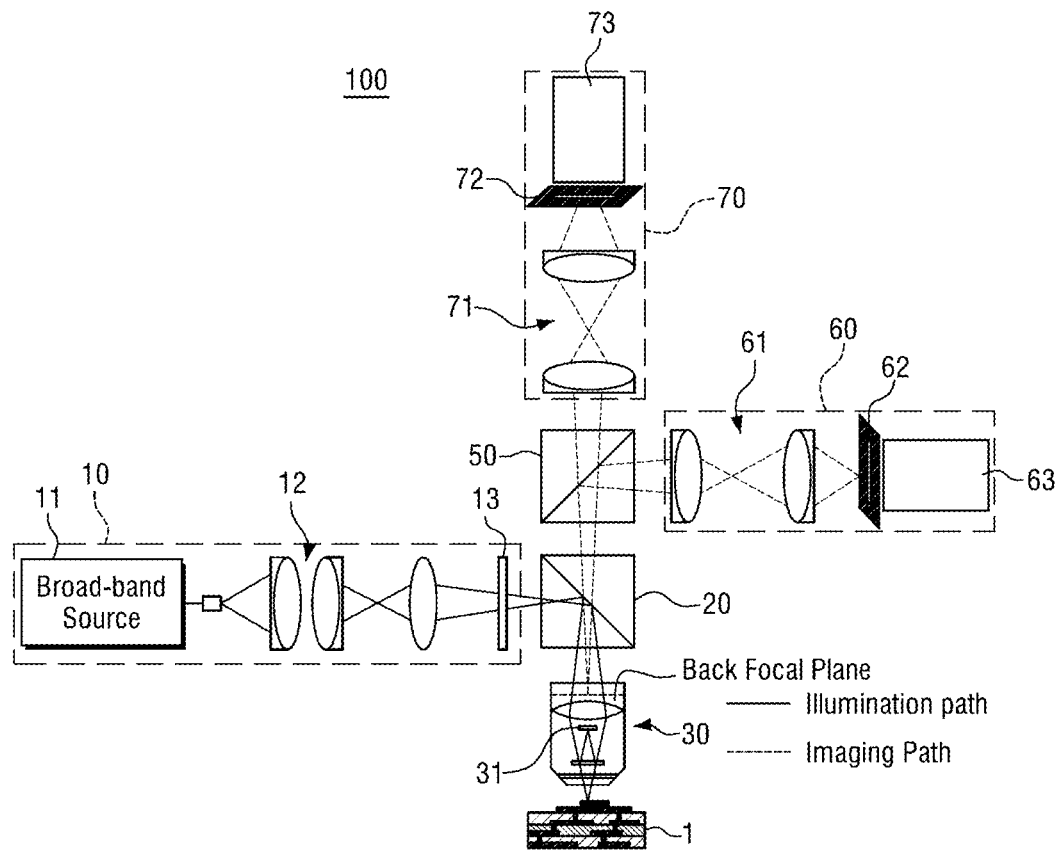

[FIG. 5]
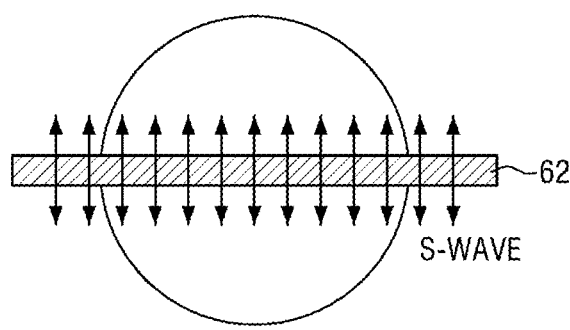
S-WAVE
[FIG. 6]
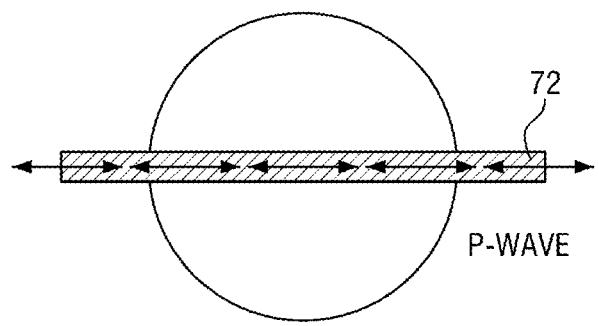
P-WAVE

[FIG. 7]
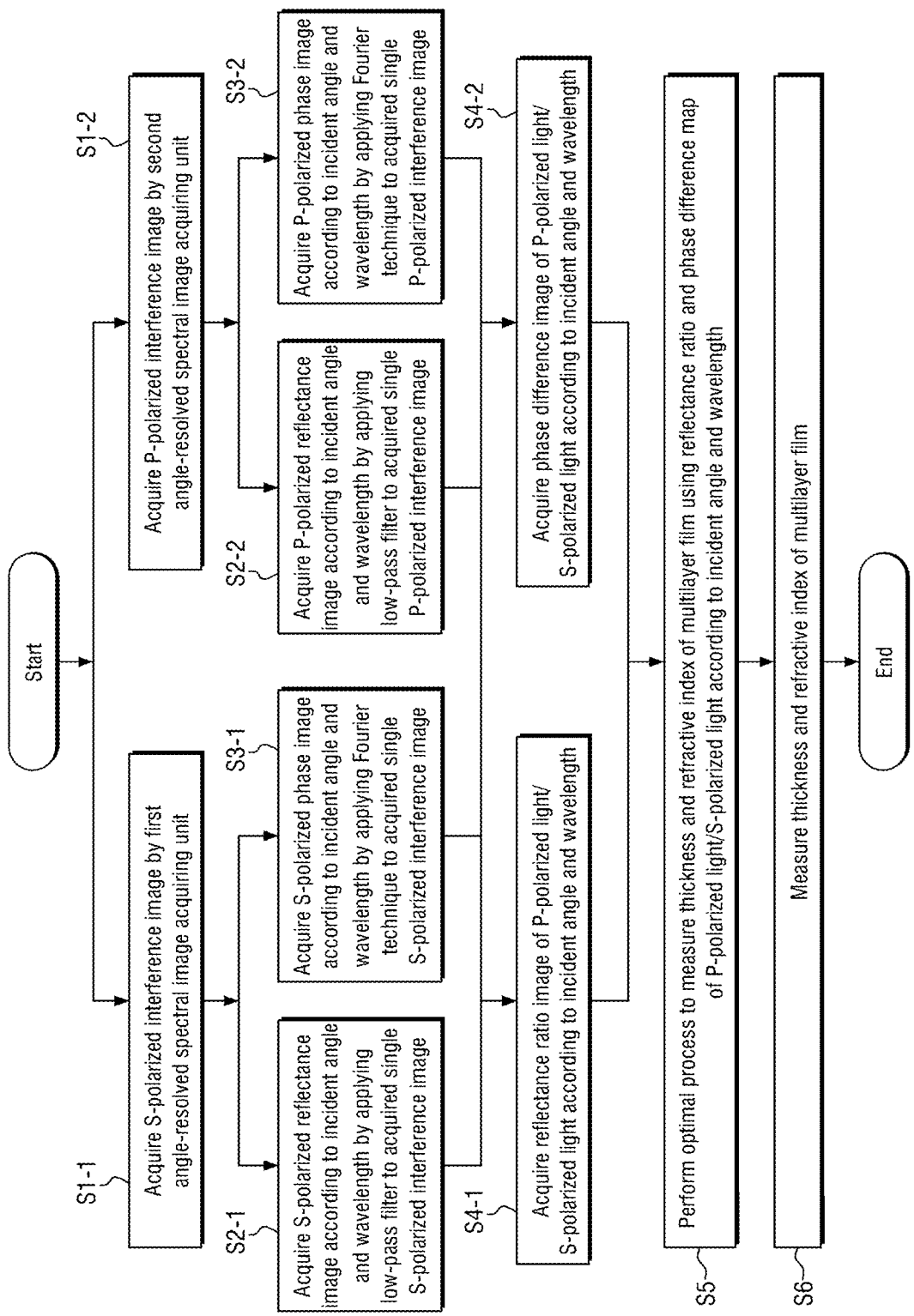

[FIG. 8]
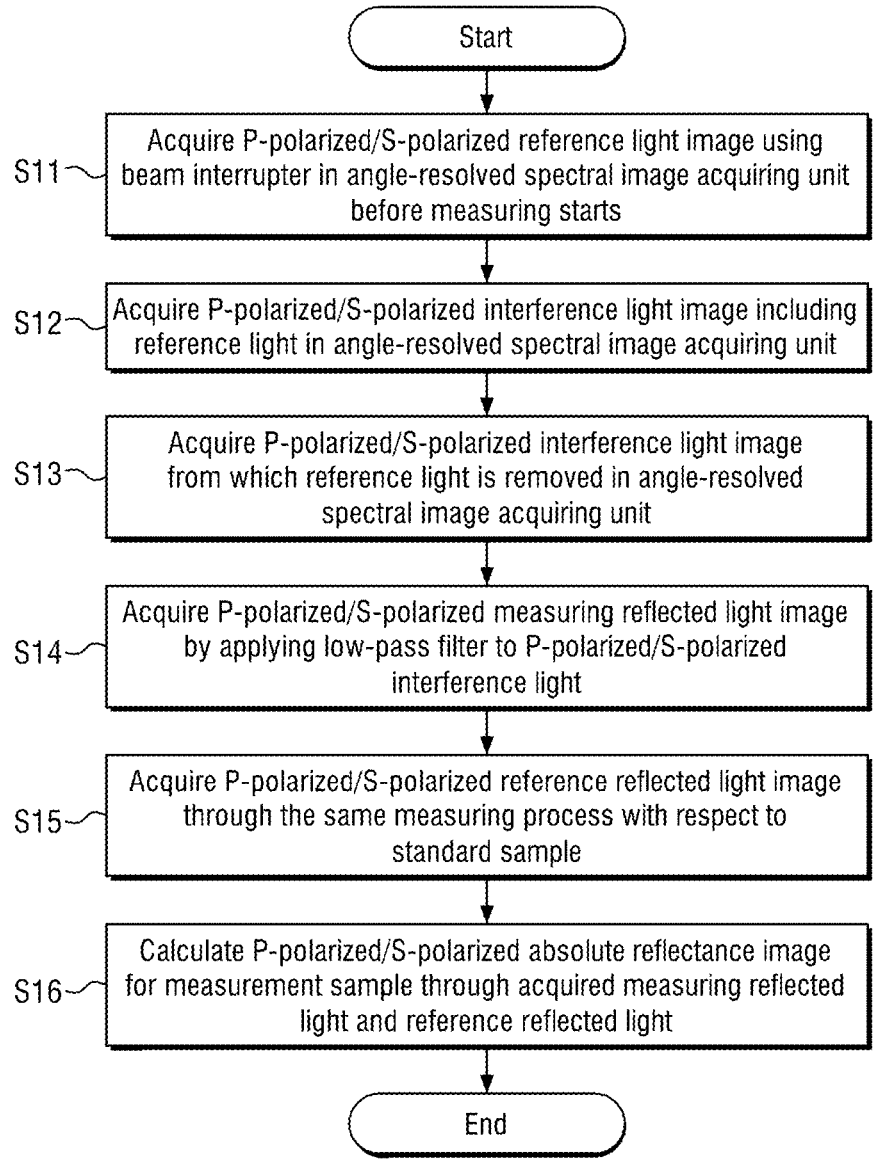

[FIG. 9]
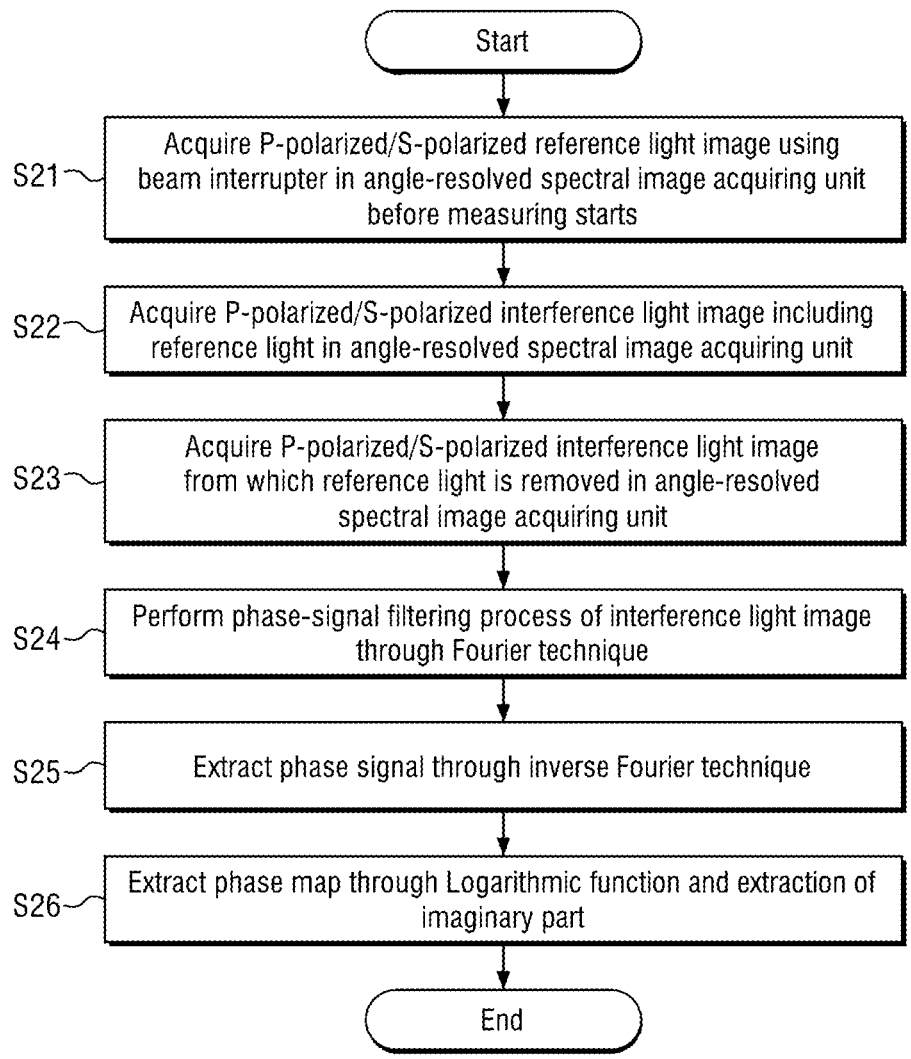

[FIG. 10]
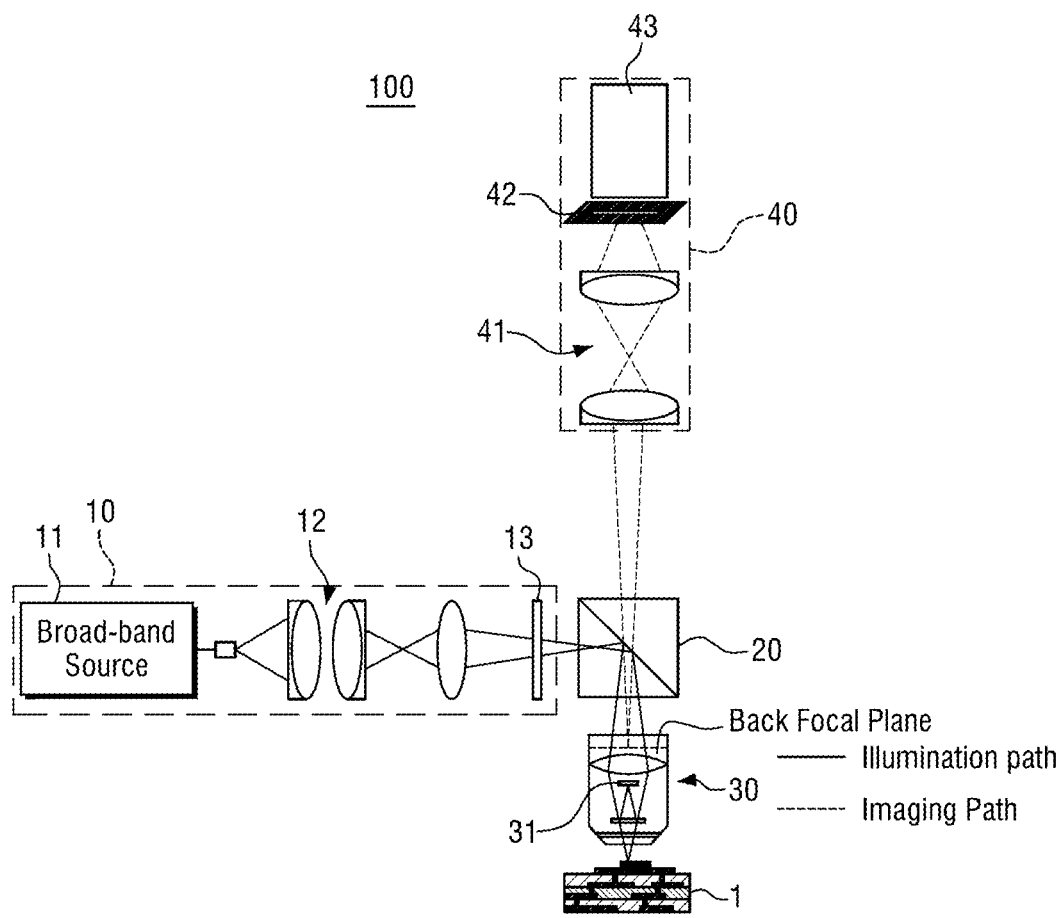
[FIG. 11]
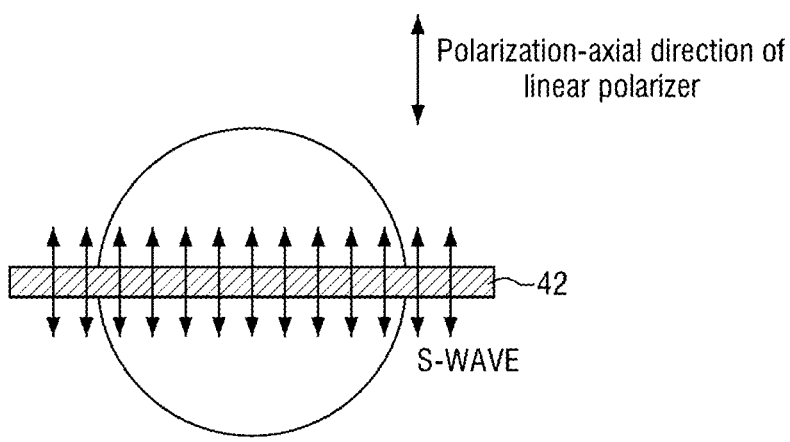

[FIG. 12]
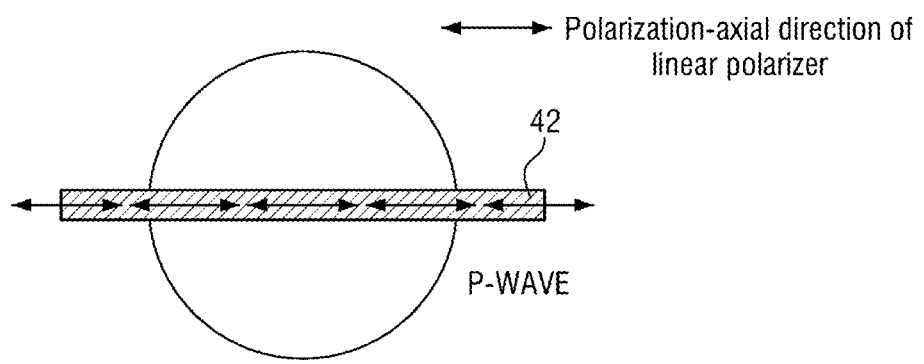

[FIG. 13]
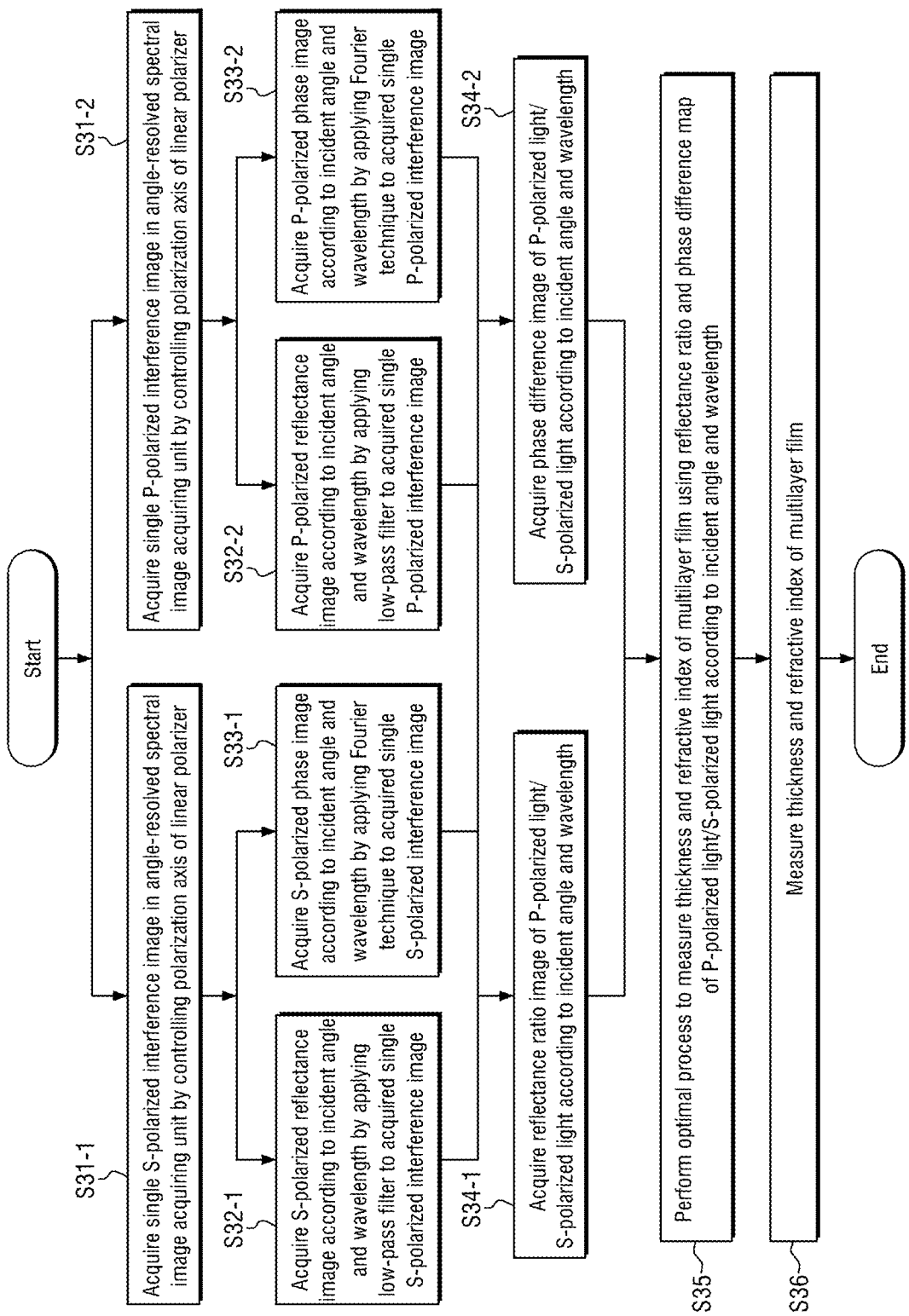

[FIG. 14]
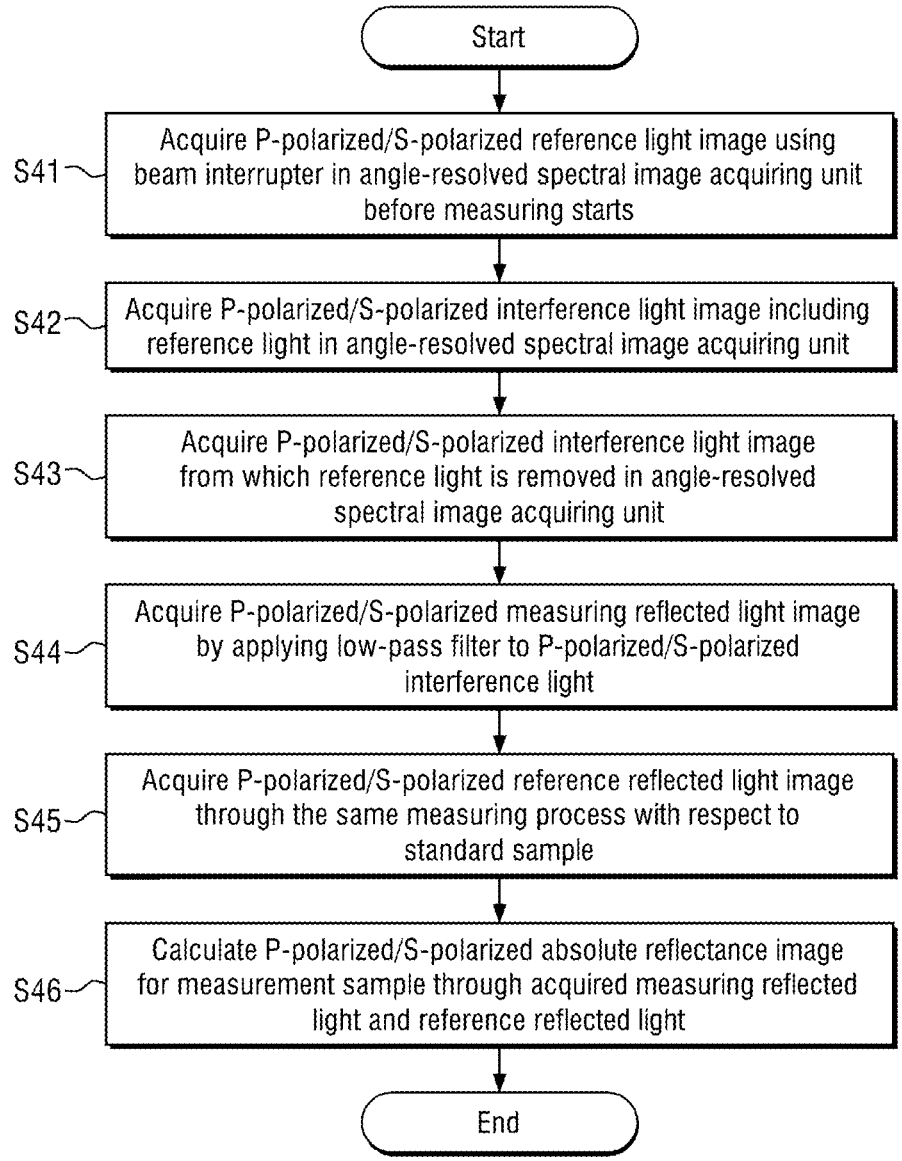

[FIG. 15]
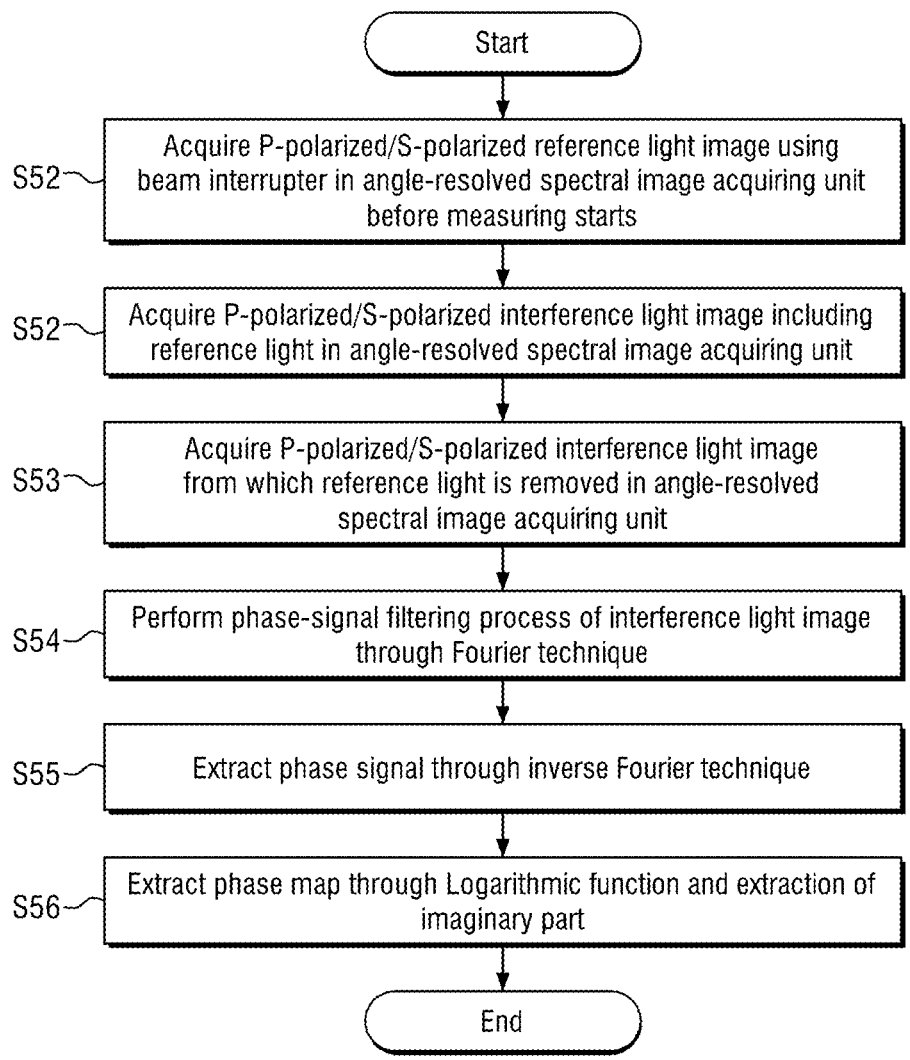

[FIG. 16]
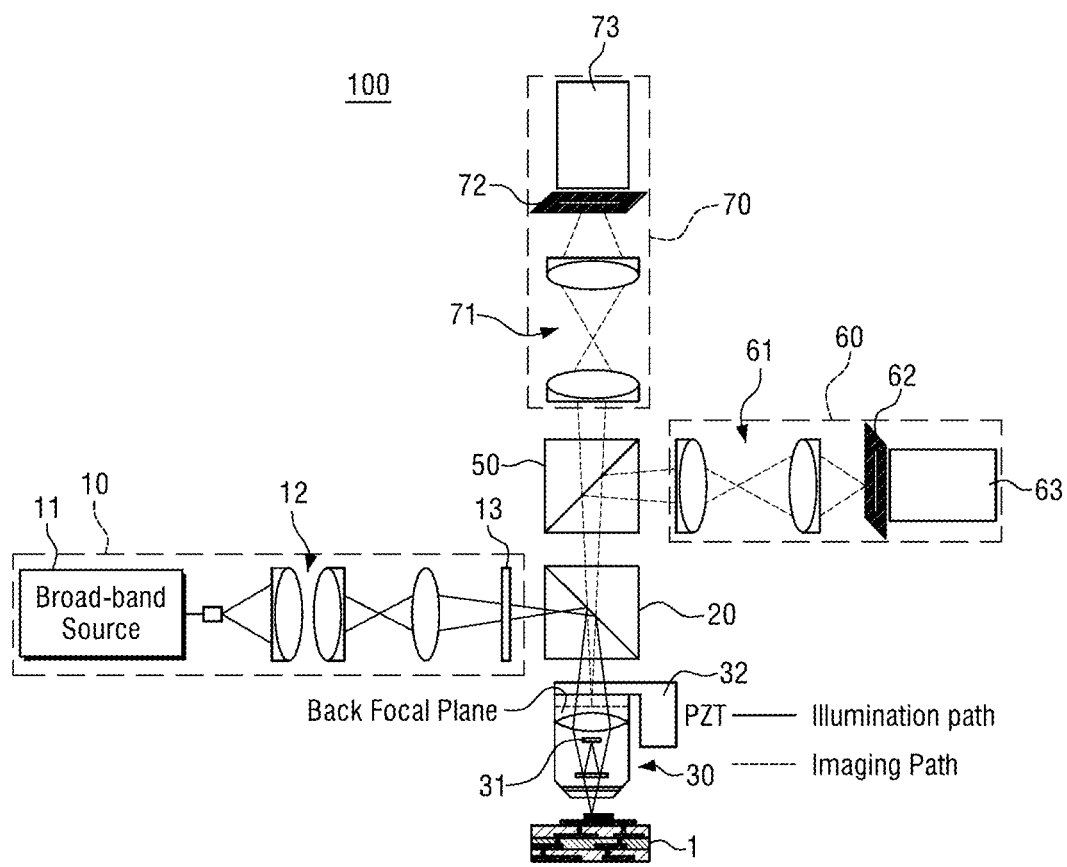
[FIG. 17]
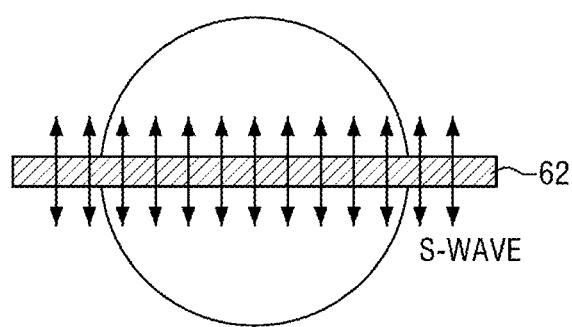

[FIG. 18]
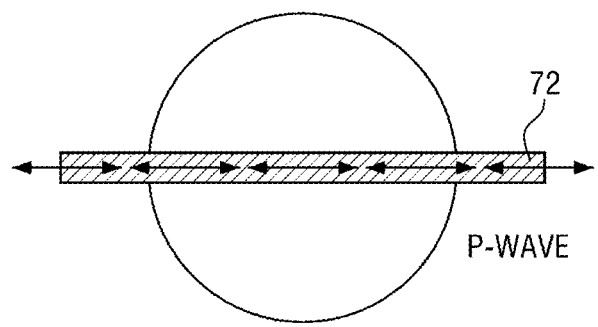

[FIG. 19]
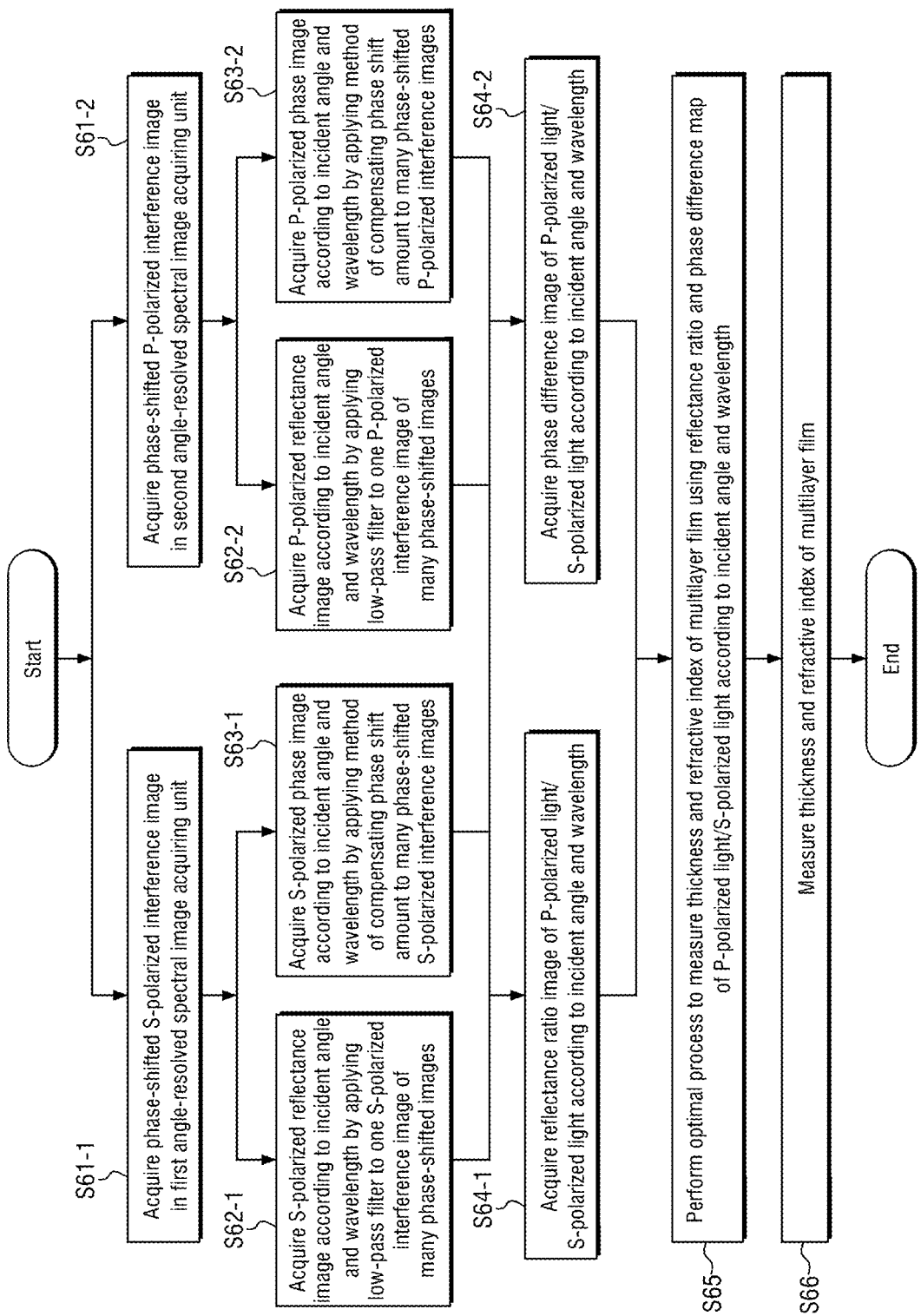

[FIG. 20]
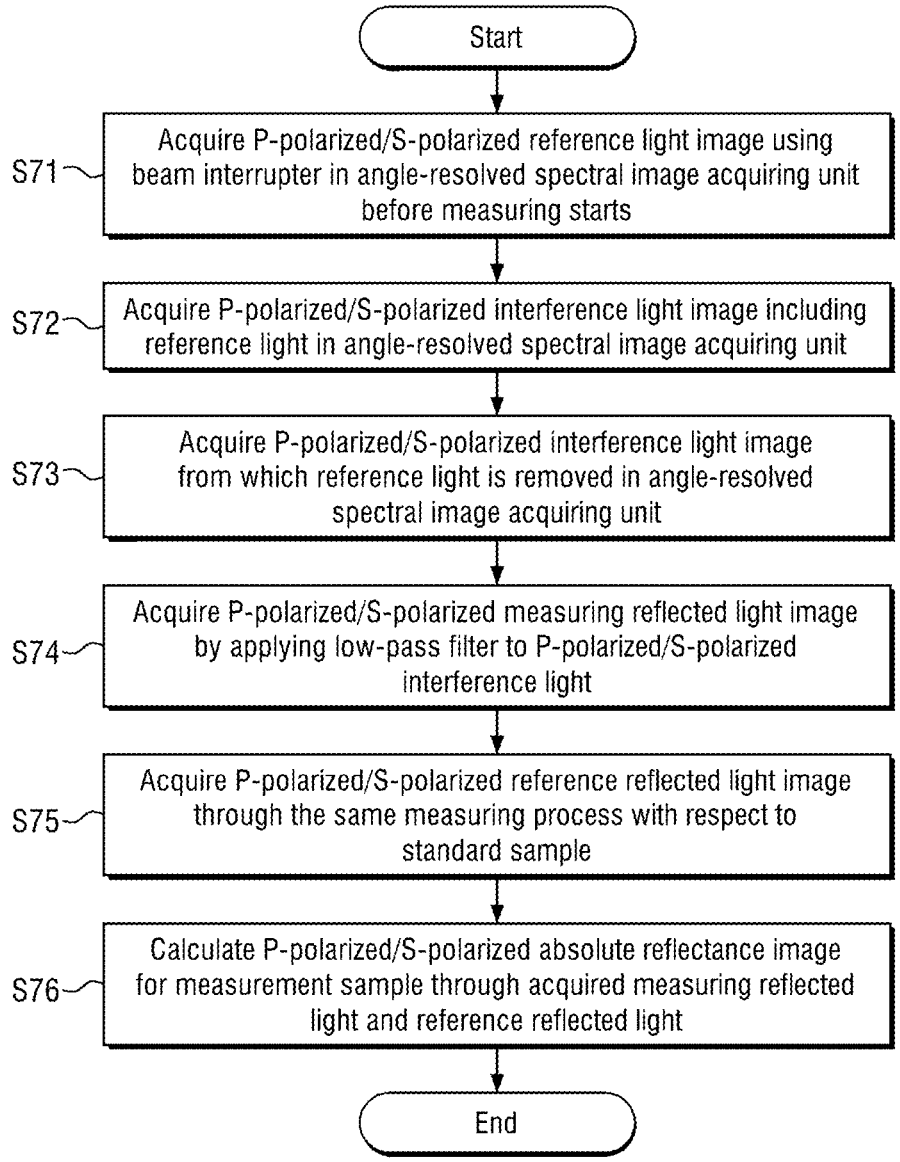

[FIG. 21]
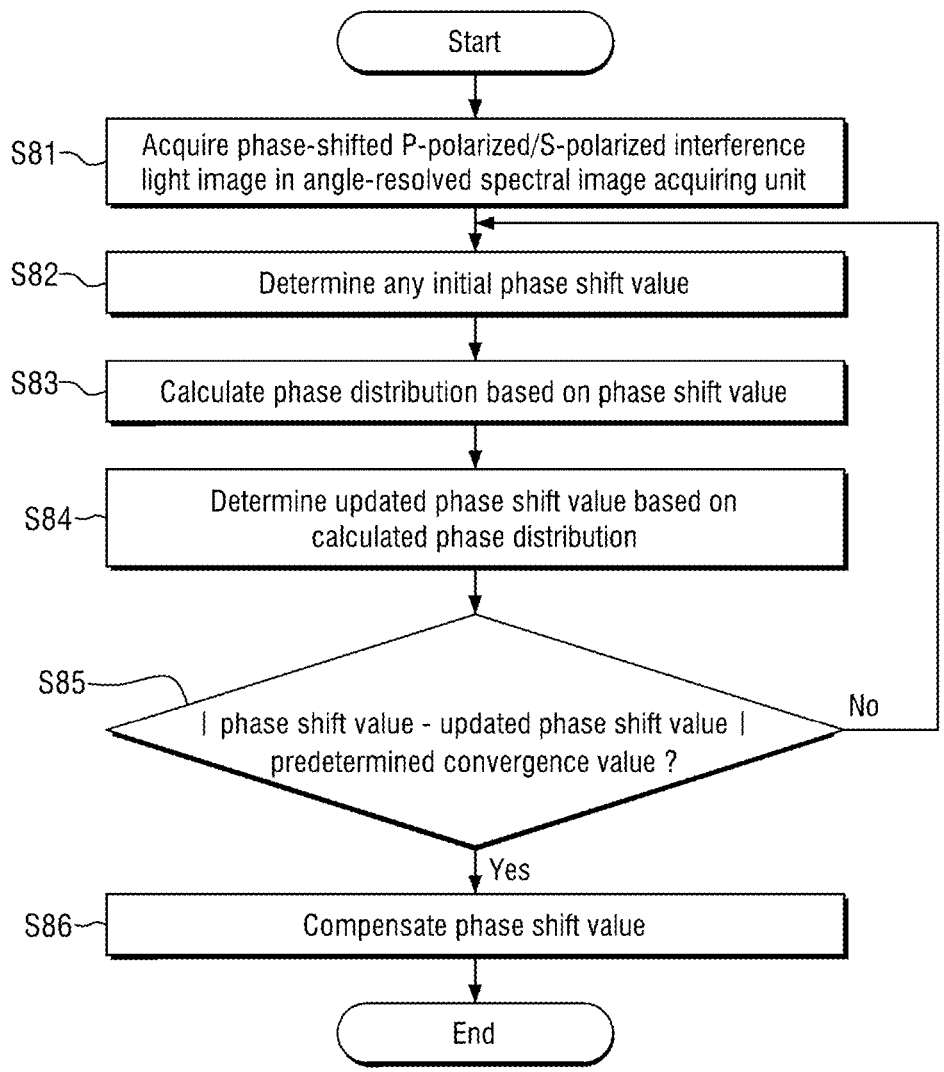

[FIG. 22]
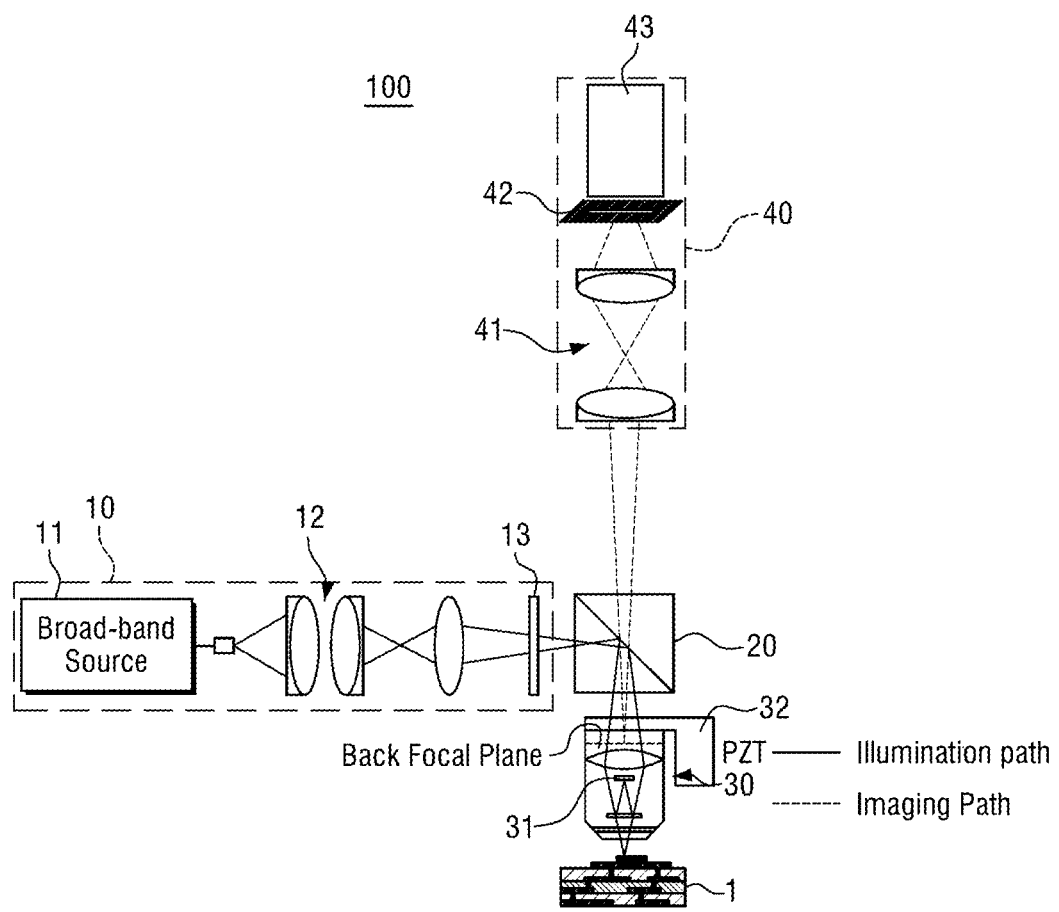

[FIG. 23]
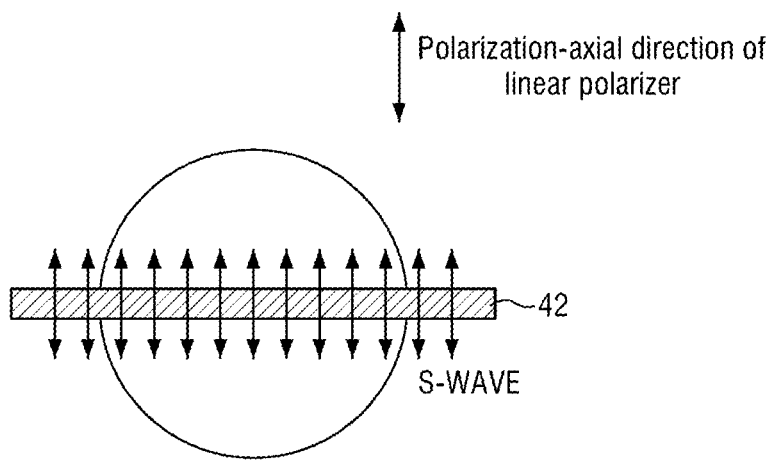
[FIG. 24]
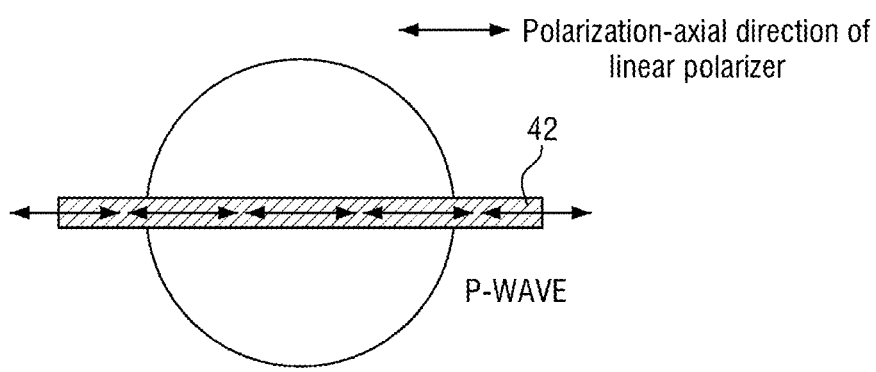

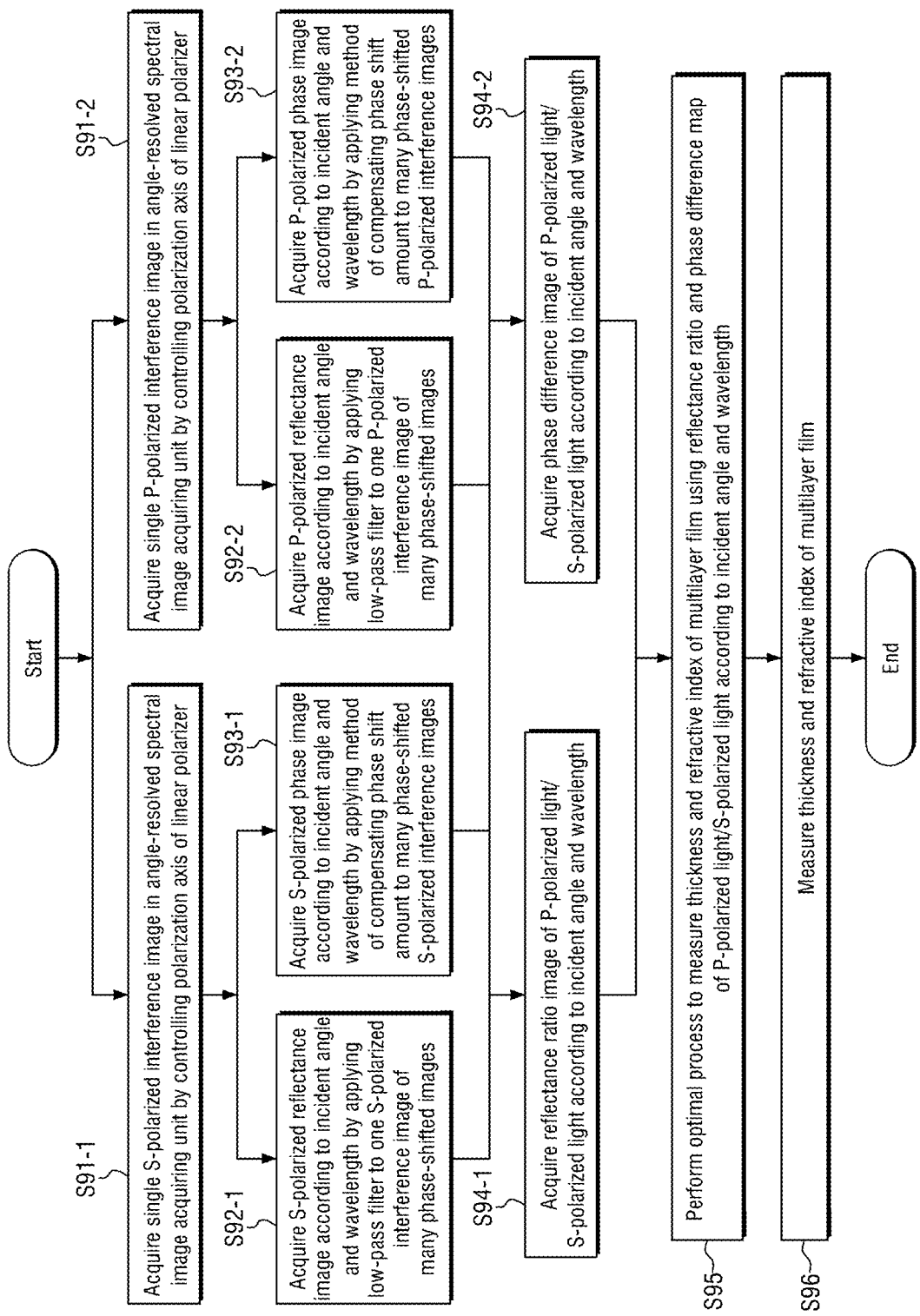
[FIG. 25]

[FIG. 26]
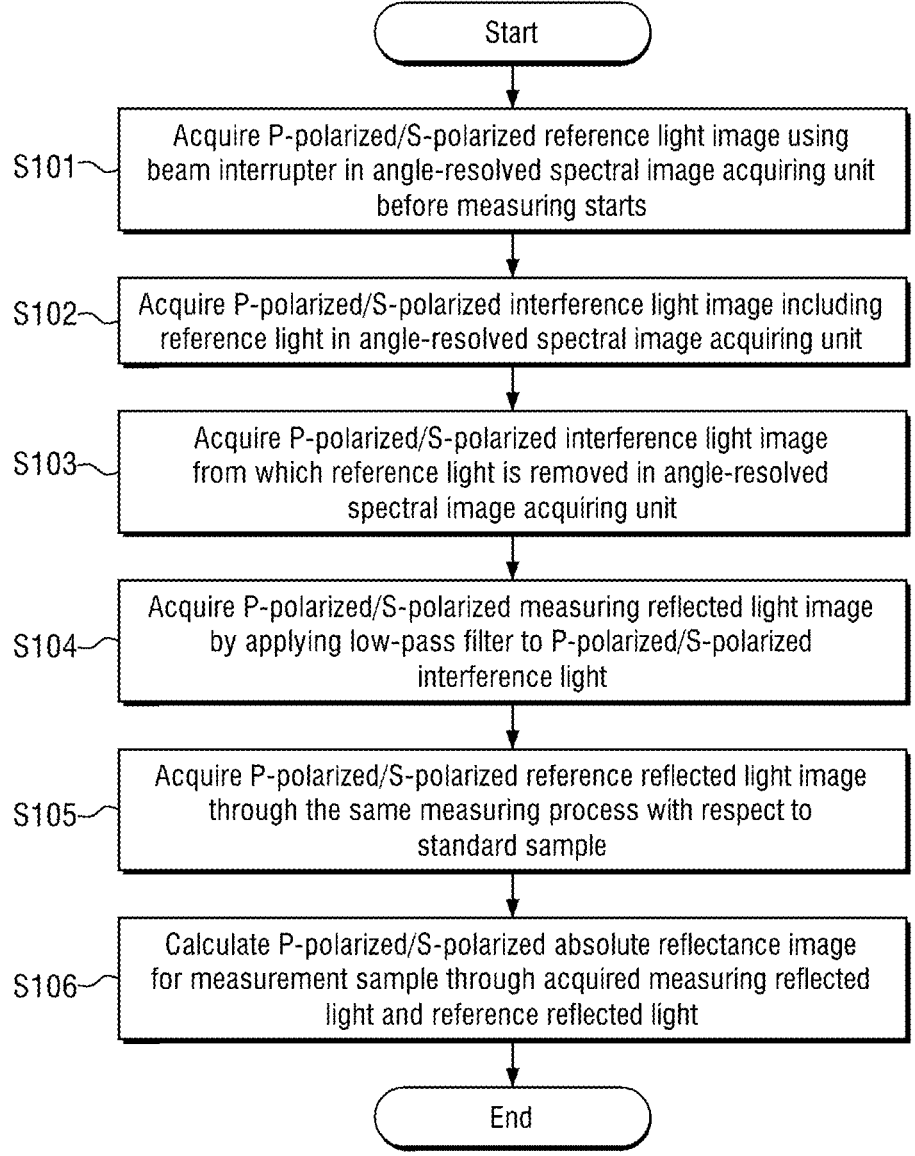

[FIG. 27]
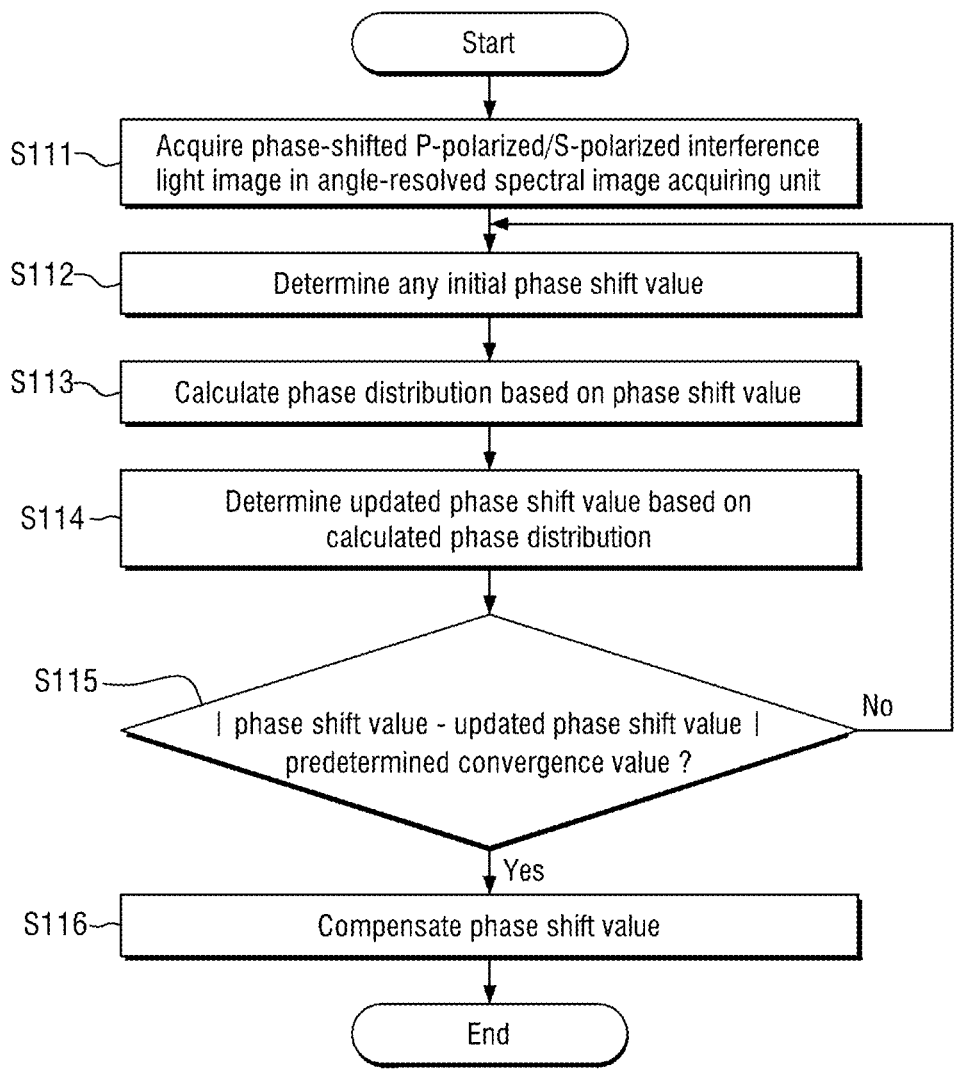

APPARATUS AND METHOD FOR MEASURING THE THICKNESS AND REFRACTIVE INDEX OF MULTILAYER THIN FILMS USING ANGLE-RESOLVED SPECTRAL INTERFERENCE IMAGE ACCORDING TO POLARIZATION

CROSS-REFERENCE TO RELATED APPLICATIONS

This application is a national phase of PCT/KR2019/009394, filed Jul. 29, 2019, the entire contents of which is hereby incorporated by reference.

TECHNICAL FIELD

The present invention relates to an apparatus and a method for measuring a thickness and a refractive index of a multilayer thin films using an angle-resolved spectral interference image according to polarization

BACKGROUND ART

As a measuring method for measuring a thickness of a thin film, reflectometry has been applied. FIG. 1 illustrates a block diagram showing a basic structure of a conventional reflectometer for measuring a thickness of a thin film.

As illustrated in FIG. 1, it can be seen that the conventional reflectometer for measuring the thickness of the thin film may be configured to include a light source 11, a beam splitter 2, a condenser lens 3, a detector 4, and the like. Light is emitted from the light source 11, the emitted light is split by the beam splitter 2 in a ratio of 50:50, and the reflected light of the split light is collected by the condenser lens 3 and irradiated to a measurement object 1.

The irradiated light is divided into light reflected from an upper layer of the measurement object 1 and light reflected from a lower layer thereof, and such a phase difference is measured and analyzed by the detector 4 to measure the thickness of the thin film.

In addition, researches on a measuring method capable of measuring the thickness of the thin film thickness have been still actively conducted. In particular, in researches on beam profile reflectometry, since 1992 when Allan Rosencwaig and four others measured the thickness and refractive index of thin film samples of various thicknesses from 3 nm to 2 μm (Allan Rosencwaig, Jon Opsal, D.L. Willenborg, S. M. Kelso, and J. T. Fanton, Beam profile reflectometry: A new technique for dielectric film measurements, Applied Physics Letter, Vol. 60, No. 11, pp.1301~1303), in 2002, a study result was reported to improve measurement performance by Qiwen Zhan(Qiwen Than and James R. Leger, Microellipsometer with radial symmetry, Applied Optics, Vol. 41, No. 22, pp. 4630~4637).

FIG. 2 illustrates a block diagram showing an apparatus for measuring a thickness of a thin film using an interferometer principle. As illustrated in FIG. 2, it can be seen that the apparatus for measuring the thickness of the thin film using the interferometer principle may be configured by including a light source 11, a first beam splitter 20, a second beam splitter 23, a first condenser lens 5, a second condenser lens 6, a reference mirror 34, a detector 4, and the like.

By the measuring apparatus illustrated in FIG. 2, a light source emitted from the light source 11 is partially reflected by the first beam splitter 20 and the other is transmitted, the light reflected by the first beam splitter 20 is incident to the second beam splitter 23, the light reflected by the second beam splitter 23 passes through the second condenser lens 6, reflected by the reference mirror 34, and then reflected to the second beam splitter 23 to be incident to the detector 4 as second reflected light, while the light passing through the second beam splitter 23 passes through the first condenser lens 5 to be reflected to the measurement object 1 and then incident to the detector 4 as first reflected light. That is, interference light of the first reflected light and the second reflected light is incident to the detector 4. Such interference light includes thickness information about the thin film.

FIG. 3 illustrates a perspective view showing a structure of a detector constituted by an angle-resolved spectral image acquiring unit. The angle-resolved spectral image acquiring unit 40 illustrated in FIG. 3 may analyze a light intensity distribution for each wavelength with respect to a line on a back focal plane of an objective lens. That is, as illustrated in FIG. 3, the angle-resolved spectral image acquiring unit 40 includes an imaging optical system 41, a slit 42, and an image spectrometer 43 and corresponds to an apparatus of acquiring only an image of only one line on a back focal plane of an objective lens to spectroscope the acquired image for each wavelength through diffractive optics, and as a result, obtaining hundreds of consecutive spectral bands for an incident angle of the objective lens. The thickness of the thin film may be measured and analyzed by such an angle-resolved spectral image acquiring unit.

DISCLOSURE

Technical Problem

Therefore, the present invention is derived to solve the problems in the related art, and according to an exemplary embodiment of the present invention, an object of the present invention is to provide an apparatus and a method for measuring and analyzing a thickness and a refractive index of each layer of a structure having a multilayer thin film through an s-polarized interference image and a p-polarized interference image of interference light which is located in a back focal plane of an objective lens by an angle-resolved spectral image acquiring unit.

Further, according to an exemplary embodiment of the present invention, an object of the present invention is to provide an apparatus and a method for measuring and analyzing a thickness and a refractive index of each layer of a structure having a multilayer thin film more accurately and rapidly by a reflectance ratio and a phase difference of an s-polarized interference image and a p-polarized interference image.

Further, according to an exemplary embodiment of the present invention, an object of the present invention is to provide an apparatus and a method for measuring and analyzing a thickness and a refractive index of each layer of a structure having a multilayer thin film by acquiring both an s-polarized interference image and a p-polarized interference image by changing a rotation angle while using a single angle-resolved spectral image acquiring unit by controlling a polarization axis of a linear polarizer.

Further, according to an exemplary embodiment of the present invention, an object of the present invention is to provide an apparatus and a method for measuring and analyzing a thickness and a refractive index of each layer of a structure having a multilayer thin film more precisely by moving an objective lens based on an optical axis to acquire many phase-shifted s-polarized interference images and p-polarized interference images and analyzing many phase-shifted interference patterns to acquire a phase value.

Meanwhile, the technical objects to be achieved in the present invention are not limited to the aforementioned technical objects, and other technical objects, which are not mentioned above, will be apparently understood to a person having ordinary skill in the art from the following description.

Technical Solution

A first aspect of the present invention may be achieved by an apparatus for measuring a thickness and a refractive index of a multilayer thin film using an angle-resolved spectral interference image according to polarization in an apparatus for measuring a thickness and a refractive index of a measurement object coated with the multilayer thin film, the apparatus including: an illumination optical module having a light source emitting light; a first beam splitter configured to reflect some of the light emitted from the illumination optical module; an objective lens configured to input some of the light reflected from the first beam splitter to the measurement object constituted by the multilayer thin film and reflect the remaining light to a reference plane to form interference light on a back focal plane; a second beam splitter in which interference light where the reflected light incident and reflected to the measurement object interferes with the reflected light reflected from the reference plane is incident, wherein some of the interference light is reflected and the remaining interference light is transmitted; a first angle-resolved spectral image acquiring unit configured to receive interference light reflected from the second beam splitter and first-polarize the interference light located in the back focal plane of the objective lens to acquire a first polarized interference image; and a second angle-resolved spectral image acquiring unit configured to receive interference light transmitted from the second beam splitter and second-polarize the interference light located in the back focal plane of the objective lens to acquire a second polarized interference image.

In addition, the apparatus may further include an analyzing means configured to measure and analyze the thickness and the refractive index of the measurement object from the first polarized interference image acquired from the first angle-resolved spectral image acquiring unit and the second polarized interference image acquired from the second angle-resolved spectral image acquiring unit.

Further, the analyzing means may measure and analyze the thickness and the refractive index of the measurement object based on a reflectance and a phase value of the first polarized interference image and a reflection and a phase value of the second polarized interference image.

In addition, the analyzing means may measure and analyze the thickness and the refractive index of the measurement object based on a ratio of the reflectance of the first polarized interference image and the reflectance of the second polarized interference image, and a phase difference between the first polarized interference image and the second polarized interference image.

Further, the second beam splitter may be configured as a polarization beam splitter, wherein the polarization beam splitter may easily split a first polarized interference image and a second polarized interference image in the first angle-resolved spectral image acquiring unit and the second angle-resolved spectral image acquiring unit regardless of a polarization-axial direction of the linear polarizer.

A second aspect of the present invention may be achieved by a method for measuring a thickness and a refractive index of a multilayer thin film using an angle-resolved spectral interference image according to polarization in a method for measuring a thickness and a refractive index of a measurement object coated with the multilayer thin film, the method including: emitting light from a broad-band light source of an illumination optical module; reflecting, by a first beam splitter, some of the light emitted from the illumination optical module; inputting, by an objective lens, some of light reflected from the first beam splitter to the measurement object constituted by the multilayer thin film and reflecting the remaining light to a reference plane to form interference light in a back focal plane; receiving the interference light to a second beam splitter, wherein some of the interference light is reflected and the remaining interference light is transmitted; receiving the interference light reflected from the second beam splitter to a first angle-resolved spectral image acquiring unit side and first-polarizing, by the first angle-resolved spectral image acquiring unit, the interference light to acquire a first polarized interference image and receiving the interference light transmitted from the second beam splitter to a second angle-resolved spectral image acquiring unit side and second-polarizing, by the second angle-resolved spectral image acquiring unit, the interference light to acquire a second polarized interference image; and measuring and analyzing, by an analyzing means, the thickness and the refractive index of the measurement object from the first polarized interference image acquired from the first angle-resolved spectral image acquiring unit and the second polarized interference image acquired from the second angle-resolved spectral image acquiring unit.

In addition, the method may further include acquiring a first polarized reflectance according to an incident angle and a wavelength by applying a low-pass filter to the first polarized interference image and acquiring a second polarized reflectance according to an incident angle and a wavelength by applying a low-pass filter to the second polarized interference image to acquire a reflectance ratio of the first polarized light and the second polarized light; acquiring a first polarized phase value according to an incident angle and a wavelength by applying a Fourier technique to the first polarized interference image and acquiring a second polarized phase value according to an incident angle and a wavelength by applying a Fourier technique to the second polarized interference image to acquire a phase difference of the first polarized light and the second polarized light; and measuring and analyzing the thickness and the refractive index of the measurement object based on the reflectance ratio and the phase difference.

Further, the acquiring of the reflectance ratio may include acquiring a first polarized reference light image for reflected light reflected to a reference plane in the first angle-resolved spectral image acquiring unit and acquiring a second polarized reference light image in the second angle-resolved spectral image acquiring unit by using a beam interrupter, before the measuring starts; acquiring a first polarized interference image including reference light in the first angle-resolved spectral image acquiring unit and acquiring a second polarized interference image including reference light in the second angle-resolved spectral image acquiring unit; acquiring a first polarized interference image and a second polarized interference image from which the reference light is removed; acquiring first polarized and second polarized measuring reflected light by applying a low-pass filter to first polarized and second polarized interference light and acquiring first polarized and second polarized reference reflected light with respect to a reference plane; and calculating a first polarized and second polarized absolute reflectance ratio for the measurement object by the acquired measuring reflected light and reference reflected light.

In addition, the acquiring of the phase difference may include: acquiring a first polarized reference light image for reflected light reflected to a reference plane in the first angle-resolved spectral image acquiring unit and acquiring a second polarized reference light image in the second angle-resolved spectral image acquiring unit by using a beam interrupter, before the measuring starts; acquiring a first polarized interference image including reference light in the first angle-resolved spectral image acquiring unit and acquiring a second polarized interference image including reference light in the second angle-resolved spectral image acquiring unit; acquiring a first polarized interference image and a second polarized interference image from which the reference light is removed; performing a phase signal filtering process for the first polarized interference image through a Fourier technique, extracting a phase signal through an inverse Fourier technique, and extracting a first polarized phase value through a logarithmic function and extraction of an imaginary part, and performing a phase signal filtering process for the second polarized interference image through a Fourier technique, extracting a phase signal through an inverse Fourier technique, and extracting a second polarized phase value through a logarithmic function and extraction of an imaginary part; and calculating a phase difference between the first polarized phase value and the second polarized phase value.

A third aspect of the present invention may be achieved by an apparatus for measuring a thickness and a refractive index of a multilayer thin film using an angle-resolved spectral interference image according to polarization in an apparatus for measuring a thickness and a refractive index of a measurement object coated with the multilayer thin film, the apparatus including: an illumination optical module having a light source emitting light; a beam splitter configured to reflect some of the light emitted from the illumination optical module; a linear polarizer provided between the illumination optical module and the beam splitter and rotated based on a polarization axis to adjust a polarization direction; an objective lens configured to input some of the light reflected from the beam splitter to the measurement object constituted by the multilayer thin film and reflect the remaining light to a reference plane to form interference light on a back focal plane; an angle-resolved spectral image acquiring unit configured to receive the interference light and first-polarize the interference light located in the back focal plane of the objective lens to acquire a first polarized interference image or second-polarize the interference light to acquire a second polarized interference image; a rotation means configures to rotate a polarization axis of the linear polarizer to acquire a first polarized interference image or a second polarized interference image in the angle-resolved spectral image acquiring unit; and an analyzing means configured to measure and analyze the thickness and the refractive index of the measurement object from a reflectance and a phase value of the first polarized interference image and a reflectance and a phase value of the second polarized interference image acquired from the angle-resolved spectral image acquiring unit.

In addition, the analyzing means may measure and analyze the thickness and the refractive index of the measurement object based on a ratio of the reflectance of the first polarized interference image and the reflectance of the second polarized interference image, and a phase difference between the first polarized interference image and the second polarized interference image.

A fourth aspect of the present invention may be achieved by a method for measuring a thickness and a refractive index of a multilayer thin film using an angle-resolved spectral interference image according to polarization in a method for measuring a thickness and a refractive index of a measurement object coated with the multilayer thin film, the method including: controlling a polarization axis of a linear polarizer so that an angle-resolved spectral image acquiring unit acquires a first polarized interference image; emitting light from a broad-band light source of an illumination optical module and reflecting, by a first beam splitter, some of the light emitted from the illumination optical module; inputting, by an objective lens, some of the light reflected from the first beam splitter to the measurement object constituted by the multilayer thin film and reflecting the remaining light to a reference plane to form interference light in a back focal plane; receiving the interference light to the angle-resolved spectral image acquiring unit side and first-polarizing the interference light to acquire a first polarized interference image in the angle-resolved spectral image acquiring unit; controlling a polarization axis of a linear polarizer so that the angle-resolved spectral image acquiring unit acquires a second polarized interference image; second-polarizing the interference light to acquire a second polarized interference image in the angle-resolved spectral image acquiring unit; and measuring and analyzing, by an analyzing means, the thickness and the refractive index of the measurement object from a reflectance and a phase value of the first polarized interference image and a reflectance and a phase value of the second polarized interference image acquired from the angle-resolved spectral image acquiring unit.

In addition, the measuring and analyzing may be to measure and analyze, by the analyzing means, the thickness and the refractive index of the measurement object based on a ratio of the reflectance of the first polarized interference image and the reflectance of the second polarized interference image, and a phase difference between the first polarized interference image and the second polarized interference image.

A fifth aspect of the present invention may be achieved by an apparatus for measuring a thickness and a refractive index of a multilayer thin film using an angle-resolved spectral interference image according to polarization in an apparatus for measuring a thickness and a refractive index of a measurement object coated with the multilayer thin film, the apparatus including: an illumination optical module having a light source emitting light; a first beam splitter configured to reflect some of the light emitted from the illumination optical module; an objective lens configured to input some of the light reflected from the first beam splitter to the measurement object constituted by the multilayer thin film and reflect the remaining light to a reference plane to form interference light on a back focal plane; a second beam splitter in which interference light where the reflected light incident and reflected to the measurement object interferes with the reflected light reflected from the reference plane is incident, wherein some of the interference light is reflected and the remaining interference light is transmitted; a first angle-resolved spectral image acquiring unit configured to receive interference light reflected from the second beam splitter and first-polarize the interference light located in the back focal plane of the objective lens to acquire a first polarized interference image; a second angle-resolved spectral image acquiring unit configured to receive interference light transmitted from the second beam splitter and second-polarize the interference light located in the back focal plane of the objective lens to acquire a second polarized interference image; a transfer device configured to move the objective lens in an optical axial direction to shift a phase so that the first angle-resolved spectral image acquiring unit acquires many phase-shifted first polarized interference images and the second angle-resolved spectral image acquiring unit acquires many phase-shifted second polarized interference images; and an analyzing means configured to measure and analyze the thickness and the refractive index of the measurement object by acquiring a reflectance of one of the many first polarized interference images and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images.

In addition, the analyzing means may measure and analyze the thickness and the refractive index of the measurement object based on a ratio of the reflectance of the first polarized interference image and the reflectance of the second polarized interference image, and a phase difference between the first polarized phase value and the second polarized phase value.

A sixth aspect of the present invention may be achieved by method for measuring a thickness and a refractive index of a multilayer thin film using an angle-resolved spectral interference image according to polarization in a method for measuring a thickness and a refractive index of a measurement object coated with the multilayer thin film, the method including: emitting light from a broad-band light source of an illumination optical module; reflecting, by a first beam splitter, some of the light emitted from the illumination optical module; inputting, by an objective lens, some of the light reflected by the first beam splitter to the measurement object constituted by the multilayer thin film and reflecting the remaining light to a reference plane to form interference light in a back focal plane; receiving the interference light to a second beam splitter, wherein some of the interference light is reflected and the remaining interference light is transmitted; receiving the interference light reflected by the second beam splitter to a first angle-resolved spectral image acquiring unit side and first-polarizing, by the first angle-resolved spectral image acquiring unit, the interference light to acquire a first polarized interference image and receiving the interference light transmitted from the second beam splitter to a second angle-resolved spectral image acquiring unit side and second-polarizing, by the second angle-resolved spectral image acquiring unit, the interference light to acquire a second polarized interference image; moving, by a transfer device, the objective lens in an optical axial direction to shift a phase so that the first angle-resolved spectral image acquiring unit acquires many phase-shifted first polarized interference images and the second angle-resolved spectral image acquiring unit acquires many phase-shifted second polarized interference images; and measuring and analyzing, by an analyzing means, the thickness and the refractive index of the measurement object by acquiring a reflectance of one of the many first polarized interference images and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images.

In addition, the method of compensating the phase shift amount may include: a first step of setting any initial phase shift value; a second step of calculating a phase distribution based on the phase shift value; a third step of updating a phase shift value based on the calculated phase distribution; a fourth step of repeating the second and third steps until a difference between the phase shift value and the updated phase shift value is equal to or less than a predetermined convergence value; and a fifth step of compensating the phase shift value.

A seventh aspect of the present invention may be achieved by an apparatus for measuring a thickness and a refractive index of a multilayer thin film using an angle-resolved spectral interference image according to polarization in an apparatus for measuring a thickness and a refractive index of a measurement object coated with the multilayer thin film, the apparatus including: an illumination optical module having a light source emitting light; a beam splitter configured to reflect some of the light emitted from the illumination optical module; a linear polarizer provided between the illumination optical module and the beam splitter and rotated based on a polarization axis to adjust a polarization direction; an objective lens configured to input some of the light reflected from the beam splitter to the measurement object constituted by the multilayer thin film and reflect the remaining light to a reference plane to form interference light on a back focal plane; an angle-resolved spectral image acquiring unit configured to receive the interference light and first-polarize the interference light located in the back focal plane of the objective lens to acquire a first polarized interference image or second-polarize the interference light to acquire a second polarized interference image; a rotation means configures to rotate a polarization axis of the linear polarizer to acquire a first polarized interference image or a second polarized interference image in the angle-resolved spectral image acquiring unit; a transfer device configured to move the objective lens in an optical axial direction to shift a phase so that the angle-resolved spectral image acquiring unit acquires many phase-shifted first polarized interference images, or the angle-resolved spectral image acquiring unit acquires many phase-shifted second polarized interference images; and an analyzing means configured to measure and analyze the thickness and the refractive index of the measurement object by acquiring a reflectance of one of the many first polarized interference images acquired from the angle-resolved spectral image acquiring unit and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images.

In addition, the analyzing means may measure and analyze the thickness and the refractive index of the measurement object based on a ratio of the reflectance of the first polarized interference image and the reflectance of the second polarized interference image, and a phase difference between the first polarized phase value and the second polarized phase value.

An eighth aspect of the present invention may be achieved by a method for measuring a thickness and a refractive index of a multilayer thin film using an angle-resolved spectral interference image according to polarization in a method for measuring a thickness and a refractive index of a measurement object coated with the multilayer thin film, the method including: controlling a polarization axis of a linear polarizer so that an angle-resolved spectral image acquiring unit acquires a first polarized interference image; emitting light from a broad-band light source of an illumination optical module and reflecting, by a first beam splitter, some of the light emitted from the illumination optical module; inputting, by an objective lens, some of the light reflected from the first beam splitter to the measurement object constituted by the multilayer thin film and reflecting the remaining light to a reference plane to form interference light in a back focal plane; receiving the interference light to the angle-resolved spectral image acquiring unit side and first-polarizing the interference light to acquire a first polarized interference image in the angle-resolved spectral image acquiring unit; moving, by a transfer device, the objective lens in an optical axis direction to shift a phase so that the angle-resolved spectral image acquiring unit acquires many phase-shifted first polarized interference images; controlling a polarization axis of a linear polarizer so that the angle-resolved spectral image acquiring unit acquires a second polarized interference image; second-polarizing the interference light to acquire a second polarized interference image in the angle-resolved spectral image acquiring unit; moving, by the transfer device, the objective lens in an optical axis direction to shift a phase so that the angle-resolved spectral image acquiring unit acquires many phase-shifted second polarized interference images; and measuring and analyzing, by an analyzing means, the thickness and the refractive index of the measurement object by acquiring a reflectance of one of the many first polarized interference images and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images.

Advantageous Effects

According to the apparatus and the method for measuring the thickness and the refractive index of the multilayer thin film using the angle-resolved spectral interference image according to polarization according to the exemplary embodiment of the present invention, it is possible to measure and analyze a thickness and a refractive index of each layer of a structure having a multilayer thin film through an s-polarized interference image and a p-polarized interference image of interference light which is located in a back focal plane of an objective lens by an angle-resolved spectral image acquiring unit.

Further, according to the apparatus and the method for measuring the thickness and the refractive index of the multilayer thin film using the angle-resolved spectral interference image according to polarization according to the exemplary embodiment of the present invention, it is possible to measure and analyze a thickness and a refractive index of each layer of a structure having a multilayer thin film more accurately and rapidly by a reflectance ratio and a phase difference of an s-polarized interference image and a p-polarized interference image.

Further, according to the apparatus and the method for measuring the thickness and the refractive index of the multilayer thin film using the angle-resolved spectral interference image according to polarization according to the exemplary embodiment of the present invention, it is possible to measure and analyze a thickness and a refractive index of each layer of a structure having a multilayer thin film by acquiring both an s-polarized interference image and a p-polarized interference image by changing a rotation angle even while using a single angle-resolved spectral image acquiring unit by controlling a polarization axis of a linear polarizer.

Further, according to the apparatus and the method for measuring the thickness and the refractive index of the multilayer thin film using the angle-resolved spectral interference image according to polarization according to the exemplary embodiment of the present invention, it is possible to measure and analyze a thickness and a refractive index of each layer of a structure having a multilayer thin film more precisely by moving an objective lens based on an optical axis to acquire many phase-shifted s-polarized interference images and p-polarized interference images and analyzing many phase-shifted interference patterns to acquire a phase value.

Meanwhile, effects which can be obtained in the present invention are not limited to the aforementioned effects, and other effects, which are not mentioned above, will be apparently understood to a person having ordinary skill in the art from the following description.

DESCRIPTION OF DRAWINGS

The accompanying drawings of this specification exemplify a preferred exemplary embodiment of the present invention, the spirit of the present invention will be more clearly understood from the following detailed description taken in conjunction with the accompanying drawings, and thus it will be understood that the present invention is not limited to only contents illustrated in the accompanying drawings:

FIG. 1 is a block diagram illustrating a basic structure of a conventional reflectometer for measuring a thickness of a thin film;

FIG. 2 is a block diagram illustrating an apparatus for measuring a thickness and shape of a thin film using an interferometer principle;

FIG. 3 is a perspective view illustrating a structure of a detector constituted by an angle-resolved spectral image acquiring unit;

FIG. 4 is a block diagram of an apparatus for measuring a thickness and a refractive index of a multilayer thin film using an angle-resolved spectral interference image according to polarization according to a first exemplary embodiment of the present invention;

FIG. 5 illustrates an image in a back focal plane of a first angle-resolved spectral image acquiring unit according to the first exemplary embodiment of the present invention;

FIG. 6 illustrates an image in a back focal plane of a second angle-resolved spectral image acquiring unit according to the first exemplary embodiment of the present invention;

FIG. 7 is a flowchart of a method for measuring a thickness and a refractive index of a multilayer thin film using an angle-resolved spectral interference image according to polarization according to a first exemplary embodiment of the present invention;

FIG. 8 is a flowchart of a method for acquiring a reflectance from a single interference image according to a first exemplary embodiment of the present invention;

FIG. 9 is a flowchart of a method for acquiring a phase from a single interference image according to a first exemplary embodiment of the present invention;

FIG. 10 is a block diagram of an apparatus for measuring a thickness and a refractive index of a multilayer thin film using an angle-resolved spectral interference image according to polarization according to a second exemplary embodiment of the present invention;

FIG. 11 illustrates an image in a back focal plane of an angle-resolved spectral image acquiring unit when a polarization-axial direction of a linear polarizer is vertical to a slit according to the second exemplary embodiment of the present invention;

FIG. 12 illustrates an image in a back focal plane of an angle-resolved spectral image acquiring unit when the polarization-axial direction of the linear polarizer is parallel with the slit according to the second exemplary embodiment of the present invention;

FIG. 13 is a flowchart of a method for measuring a thickness and a refractive index of a multilayer thin film using an angle-resolved spectral interference image according to polarization according to a second exemplary embodiment of the present invention;

FIG. 14 is a flowchart of a method for acquiring a reflectance from a single interference image according to a second exemplary embodiment of the present invention;

FIG. 15 is a flowchart of a method for acquiring a phase from a single interference image according to a second exemplary embodiment of the present invention;

FIG. 16 is a block diagram of an apparatus for measuring a thickness and a refractive index of a multilayer thin film using an angle-resolved spectral interference image according to polarization according to a third exemplary embodiment of the present invention;

FIG. 17 illustrates an image in a back focal plane of a first angle-resolved spectral image acquiring unit according to the third exemplary embodiment of the present invention;

FIG. 18 illustrates an image in a back focal plane of a second angle-resolved spectral image acquiring unit according to the third exemplary embodiment of the present invention;

FIG. 19 is a flowchart of a method for measuring a thickness and a refractive index of a multilayer thin film using an angle-resolved spectral interference image according to polarization according to a third exemplary embodiment of the present invention;

FIG. 20 is a flowchart of a method for acquiring a reflectance from a single interference image according to a third exemplary embodiment of the present invention;

FIG. 21 is a flowchart of a method for acquiring a phase from many interference images according to a third exemplary embodiment of the present invention;

FIG. 22 is a block diagram of an apparatus for measuring a thickness and a refractive index of a multilayer thin film using an angle-resolved spectral interference image according to polarization according to a fourth exemplary embodiment of the present invention;

FIG. 23 illustrates an image in a back focal plane of an angle-resolved spectral image acquiring unit when a polarization-axial direction of a linear polarizer is vertical to a slit according to the fourth exemplary embodiment of the present invention;

FIG. 24 illustrates an image in a back focal plane of an angle-resolved spectral image acquiring unit when the polarization-axial direction of the linear polarizer is parallel with the slit according to the fourth exemplary embodiment of the present invention;

FIG. 25 is a flowchart of a method for measuring a thickness and a refractive index of a multilayer thin film using an angle-resolved spectral interference image according to polarization according to a fourth exemplary embodiment of the present invention;

FIG. 26 is a flowchart of a method for acquiring a reflectance from a single interference image according to a fourth exemplary embodiment of the present invention; and FIG. 27 is a flowchart of a method for acquiring a phase from many interference images according to a fourth exemplary embodiment of the present invention.

[Description of Main Reference Numerals of Drawings]

| | |
|---|---|
| 1: Measurement object | 2: Beam splitter |
| 3: Condenser lens | 4: Detector |
| 5: First condenser lens | 6: Second condenser lens |
| 10: Illumination optical module | 11: Light source |
| 12: Illumination optical system | 13: Linear polarizer |
| 20: First beam splitter | 30: Objective lens |
| 31: Reference plane | 32: Piezoelectric drive unit |
| 40: Angle-resolved spectral image acquiring unit | |
| 41: Imaging optical system | 42: Slit |
| 43: Image spectrometer | 50: Second beam splitter |
| 60: First angle-resolved spectral image acquiring unit | |
| 61: First imaging optical system | 62: First slit |
| 63: First image spectrometer | |
| 70: Second angle-resolved spectral image acquiring unit | |
| 71: Second imaging optical system | 72: Second slit |
| 73: Second image spectrometer | |
| 100: Device for measuring thickness and refractive index of multilayer thin film using angle-resolved spectral interference image according to polarization | |

BEST MODE

Hereinafter, a configuration, a function, and a measuring method of an apparatus 100 for measuring a thickness and a refractive index of a multilayer thin film using an angle-resolved spectral interference image according to polarization according to a first exemplary embodiment of the present invention will be described. First, FIG. 4 is a block diagram of an apparatus 100 for measuring a thickness and a refractive index of a multilayer thin film using an angle-resolved spectral interference image according to polarization according to a first exemplary embodiment of the present invention. In addition, FIG. 5 illustrates an image in a back focal plane of a first angle-resolved spectral image acquiring unit 60 according to the first exemplary embodiment of the present invention and FIG. 6 illustrates an image in a back focal plane of a second angle-resolved spectral image acquiring unit 70 according to the first exemplary embodiment of the present invention.

As illustrated in FIG. 4, it can be seen that the apparatus 100 for measuring the thickness and the refractive index of the multilayer thin film using an angle-resolved spectral interference image according to polarization according to the first exemplary embodiment of the present invention may be configured by including an illumination optical module 10, a first beam splitter 20, an objective lens 30 having a reference plane 31, a second beam splitter 50, a first angle-resolved spectral image acquiring unit 60, a second angle-resolved spectral image acquiring unit, and the like.

The illumination optical module 10 may be configured by including a broad-band light source 11 emitting light, and an illumination optical system 12 emitting the light emitted from the broad-band light source 11 to an object to be measured so as to have a uniform light intensity distribution by the objective lens 30. As a specific exemplary embodiment of the present invention, the broad-band light source 11 is configured to emit light having a wavelength of 400 nm to 700 nm.

In addition, the first beam splitter 20 reflects a part of the light emitted from the illumination optical module 10 to input the part of the light to the objective lens 30. Further, as illustrated in FIG. 4, a linear polarizer 13 may be provided between the illumination optical system 12 and the first beam splitter 20. The linear polarizer 13 adjusts a polarization direction of the beam incident to the objective lens 30 so that a component of s-polarized light passes through a first slit and a component of p-polarized light passes through a second slit.

In the exemplary embodiment of the present invention, the objective lens 30 having a high numerical aperture is applied. The numerical aperture of the objective lens 30 should be as high as possible. In theory, the highest numerical aperture is 1 when the objective lens 30 is used in the air. For reference, the numerical aperture of the objective lens 30 used in the experiment is 0.9. The incident angle at this time is changed from 0° to 64°. In addition, as illustrated in FIG. 4, the objective lens 30 includes a reference plane 31.

A part of the light reflected from the first beam splitter 20 is incident and reflected to the measurement object 1 constituted by the multilayer thin film through the objective lens 30. In addition, the remaining light is reflected on the reference plane 31, and the reflected light reflected on the reference plane 31 and the light incident on and reflected from the measurement object 1 interfere with each other to form interference light in the back focal plane.

In addition, the interference light passes through the first beam splitter 20 and then is incident to the second beam splitter 50 so that some of the interference light is reflected and the rest of the interference light is transmitted.

The second beam splitter 50 may also be a polarizing beam splitter, wherein the polarizing beam splitter easily splits and sends a first polarized interference image and a second polarized interference image to a first angle-resolved spectral image acquiring unit 60 and a second angle resolved spectral image acquiring unit 70 regardless of the polarization-axial direction of the linear polarizer.

Further, as illustrated in FIG. 4, the interference light, reflected from the second beam splitter 50, is incident to the first angle-resolved spectral image acquiring unit 60 side, while the interference light passing through the second beam splitter 50 is incident to the second angle resolved spectral image acquiring unit 70 side.

The first angle-resolved spectral image acquiring unit 60 receives interference light reflected from the second beam splitter 50 and first-polarizes the interference light located in the back focal plane of the objective lens 30 to acquire a first polarized interference image. The first polarized interference image may be an s-polarized interference image in the exemplary embodiment. On the contrary, the second angle-resolved spectral image acquiring unit 70 receives the interference light passing through the second beam splitter 50 and second-polarizes the interference light located in the back focal plane of the objective lens 30 to acquire a second polarized interference image. The second polarized interference image may be a p-polarized interference image in the exemplary embodiment.

In addition, the analyzing means measures and analyzes the thickness and refractive index of the measurement object 1 from the s-polarized interference image acquired from the first angle-resolved spectral image acquiring unit 60 and the p-polarized interference image acquired from the second angle-resolved spectral image acquiring unit 70.

In addition, the first angle-resolved spectral image acquiring unit 60 is configured by including a first imaging optical system 61 imaging the interference light located in the back focal plane of the objective lens 30 reflected from the second beam splitter 50, a first slit 62 transmitting only s-polarization in the back focal plane emitted from the first imaging optical system 61, and a first image spectrometer 63 acquiring an s-polarized interference image.

Further, the second angle-resolved spectral image acquiring unit 70 is configured by including a second imaging optical system 71 imaging the interference light located in the back focal plane of the objective lens 30 transmitted from the second beam splitter 50, a second slit 72 transmitting only p-polarization in the back focal plane emitted from the second imaging optical system 71, and a second image spectrometer 73 acquiring a p-polarized interference image.

In addition, the analyzing means measures and analyzes the thickness and refractive index of the measurement object 1 based on a reflectance and a phase value of the s-polarized interference image and a reflectance and a phase value of the p-polarized interference image.

More specifically, the analyzing means measures and analyzes the thickness and refractive index of the measurement object 1 based on a reflectance ratio between the reflectance of the s-polarized interference image and the reflectance of the p-polarized interference image and a phase difference between the s-polarized interference image and the p-polarized interference image.

Description of Embodiments

Hereinafter, a method for measuring a thickness and a refractive index of a multilayer thin film using an angle-resolved spectral interference image according to polarization according to a first exemplary embodiment of the present invention will be described. FIG. 7 is a flowchart of a method for measuring a thickness and a refractive index of a multilayer thin film using an angle-resolved spectral interference image according to polarization according to a first exemplary embodiment of the present invention.

First, as described above, the first angle-resolved spectral image acquiring unit 60 acquires a single s-polarized interference image $I_s$ (S1-1) and the second angle-resolved spectral image acquiring unit 70 acquires a single p-polarized interference image $I_p$ (S1-2).

In addition, an s-polarized reflectance $R_s$ image according to an incident angle and a wavelength is acquired by applying a low-pass filter to the acquired single s-polarized interference image (S2-1), and a p-polarized reflectance $R_p$ image according to the incident angle and the wavelength is acquired by applying a low-pass filter to the acquired single p-polarized interference image (S2-2). In addition, an s-polarized phase $\Phi_s$ image according to an incident angle and a wavelength is acquired by applying a Fourier technique to the acquired single s-polarized interference image (S3-1), and a p-polarized phase $\Phi_p$ image according to the incident angle and the wavelength is acquired by applying a Fourier technique to the acquired single p-polarized interference image (S3-2).

Then, a reflectance ratio ($\rho=R_p/R_s$) of p-polarized light/s-polarized light according to the incident angle and the wavelength is acquired (S4-1), and a phase difference ($\delta=\Phi_p-\Phi_s$) image of p-polarized light/s-polarized light according to the incident angle and the wavelength is acquired (S4-2).

In addition, after an optimal process is performed to measure the thickness and the refractive index of the multilayer film using the reflectance ratio of p-polarized light/s-polarized light and the phase difference of p-polarized light/s-polarized light according to the incident angle and the wavelength (S5), the thickness and the refractive index of the multilayer film are measured (S6).

Hereinafter, a procedure for acquiring the reflectance from the single interference image described above according to the first exemplary embodiment of the present invention will be described in more detail. FIG. 8 illustrates a flowchart of a method for acquiring a reflectance from a single interference image according to a first exemplary embodiment of the present invention.

First, before the measuring starts, the light incident to the objective lens 30 is not incident to the measurement object 1 but reflected only to the reference plane 31 by using a beam interrupter between the objective lens 30 and the measurement object 1, so that the first and second angle-resolved spectral image acquiring units 60 and 70 may acquire an s-polarized/p-polarized reference light image ($I_o=I_{ref}$) (S11).

In addition, the first and second angle-resolved spectral image acquiring units 60 and 70 acquire an s-polarized/p-polarized interference light ($I_1$) image including reference light (S12). The interference light including the reference light may be represented by Equation 1 below.

$$I_1 = I_{ref} + I_{sam} + 2\sqrt{I_{ref}*I_{sam}} \cos \Phi \qquad \text{[Equation 1]}$$

In Equation 1, $I_{sam}$ is s-polarized/p-polarized measuring reflected light. In addition, an s-polarized/p-polarized interference light ($I_2$) image from which the reference light is removed is acquired by Equation 2 below (S13).

$$I_2 = I_1 - I_0 = I_{sam} + 2\sqrt{I_{ref}*I_{sam}} \cos \Phi \qquad \text{[Equation 2]}$$

In addition, in Equation 2, an s-polarized/p-polarized measuring reflected light ($I_{sam}$) image may be acquired by applying a low-pass filter (S14).

In addition, through the same measurement process for a standard sample, an s-polarized/p-polarized reference reflected light ($I_{std}$) image is acquired (S15), and through the acquired measuring reflected light ($I_{sam}$) and the reference reflected light ($I_{std}$), an s-polarized/p-polarized absolute reflectance ratio ($R_{sam}$) image for the measurement object 1 is calculated by Equation 3 (S16).

$$R_{sam} = R_{std} * \sqrt{\frac{I_{sam}}{I_{std}}} \qquad \text{[Equation 3]}$$

Hereinafter, a method for extracting a phase value from a single interference image will be described in more detail. FIG. 9 illustrates a flowchart of a method for acquiring a phase from a single interference image according to a first exemplary embodiment of the present invention.

First, before the measuring starts, the light incident to the objective lens 30 is not incident to the measurement object 1 but reflected only to the reference plane 31 by using a beam interrupter between the objective lens 30 and the measurement object 1, so that the first and second angle-resolved spectral image acquiring units 60 and 70 acquires an s-polarized/p-polarized reference light image ($I_o=I_{ref}$) (S21).

In addition, the first and second angle-resolved spectral image acquiring units 60 and 70 acquire an s-polarized/p-polarized interference light ($I_1$) image including reference light (S22). The interference light including the reference light may be represented by Equation 1 described above.

In addition, an s-polarized/p-polarized interference light ($I_2$) image from which the reference light is removed is acquired by Equation 2 described above (S23).

In addition, the acquired interference light ($I_2$) image is subjected to a phase signal filtering process through Fourier techniques of Equations 4 and 5 below (S24).

$$FT(I_2) = FT(I_{sam}) + FT(\sqrt{I_{ref}*I_{sam}}*e^{-\Phi i}) + FT(\sqrt{I_{ref}*I_{sam}}*e^{\Phi i}) \qquad \text{[Equation 4]}$$

$$\text{Filtered Signal} = FT(\sqrt{I_{ref}*I_{sam}}*e^{-\Phi i}) \qquad \text{[Equation 5]}$$

In addition, as shown in Equation 6, after a phase signal is extracted by an inverse Fourier technique (S25), a phase image is extracted by a logarithmic function and extraction of an imaginary part as shown in Equation 7 (S26).

$$IFT(\text{Filtered Signal}) = IFT(FT(\sqrt{I_{ref}*I_{sam}}*e^{-\Phi i}) \qquad \text{[Equation 6]}$$

$$\text{Log}[\sqrt{I_{ref}*I_{sam}}*e^{-\Phi i}] = \text{Log}[\sqrt{I_{ref}*I_{sam}}]^{-\Phi i} \qquad \text{[Equation 7]}$$

Extraction of imaginary part: $\Phi$

Hereinafter, a configuration and a function of an apparatus 100 for measuring a thickness and a refractive index of a multilayer thin film using an angle-resolved spectral interference image according to polarization according to a second exemplary embodiment of the present invention will be described. FIG. 10 illustrates a block diagram of an apparatus 100 for measuring a thickness and a refractive index of a multilayer thin film using an angle-resolved spectral interference image according to polarization according to a second exemplary embodiment of the present invention. FIG. 11 illustrates an image in a back focal plane of an angle-resolved spectral image acquiring unit 40 when a polarization-axial direction of a linear polarizer 13 is vertical to a slit according to the second exemplary embodiment of the present invention, and FIG. 12 illustrates an image in a back focal plane of the angle-resolved spectral image acquiring unit 40 when the polarization-axial direction of the linear polarizer 13 is parallel with the slit according to the second exemplary embodiment of the present invention.

The second exemplary embodiment of the present invention is configured by including the illumination optical module 10, the objective lens 30, etc., like the first exemplary embodiment described above, but the second exemplary embodiment of the present invention is configured by including a linear polarizer 13 which is rotated with respect to a polarization axis by a rotation means to adjust a polarization direction and a single angle-resolved spectral image acquiring unit 40. According to the second exemplary embodiment of the present invention, the polarization axis of the linear polarizer 13 is rotated so that the single angle-resolved spectral image acquiring unit 40 may acquire an s-polarized interference image and a p-polarized interference image, respectively.

That is, the linear polarizer 13 is provided between the illumination optical module 10 and the beam splitter and rotated based on the polarization axis to adjust the polarization direction, and the spectral image acquiring unit 40 receives the interference light as illustrated in FIG. 10 and first-polarizes the interfering light located on the back focal plane of the objective lens 30 to acquire a first polarized interference image or second-polarizes the interfering light located on the back focal plane of the objective lens 30 to acquire a second polarized interference image.

That is, the polarization axis of the linear polarizer 13 is rotated by the rotating means so that the angle-resolved spectral image acquiring unit 40 acquires the first polarized interference image or the second polarized interference image.

As illustrated in FIG. 11, when the polarization-axial direction of the linear polarizer 13 is vertical to the slit 42, an s-polarized state is observed by the spectral image acquiring unit 40, and as illustrated in FIG. 12, when the polarization-axial direction of the linear polarizer 13 is parallel with the slit 42, a p-polarized state is observed by the spectral image acquiring unit 40.

Therefore, according to the second exemplary embodiment of the present invention, the polarization-axial direction of the linear polarizer 13 is changed so that the single spectral image acquiring unit 40 may acquire an s-polarized interference image and a p-polarized interference image.

In addition, the analyzing means measures and analyzes the thickness and the refractive index of the measurement object 1 from the reflectance and the phase value of the first polarized interference image and the reflectance and the phase value of the second polarized interference image acquired from the angle-resolved spectral image acquiring unit 40. That is, the analyzing means measures and analyzes the thickness and refractive index of the measurement object 1 based on a ratio of the reflectance of the first polarized interference image and the reflectance of the second polarized interference image, and a phase difference between the first polarized interference image and the second polarized interference image. Such an analyzing method is the same as that of the first exemplary embodiment described above.

FIG. 13 is a flowchart of a method for measuring a thickness and a refractive index of a multilayer thin film using an angle-resolved spectral interference image according to polarization according to a second exemplary embodiment of the present invention. First, the angle-resolved spectral image acquiring unit 40 controls a polarization axis of the linear polarizer 13 so as to acquire an s-polarized interference image. In addition, light is emitted from the broad-band light source of the illumination optical module 10, and the first beam splitter 20 reflects some of the light emitted from the illumination optical module 10. Some of the light reflected from the first beam splitter 20 is incident to the measurement object 1 constituted by the multilayer thin film through the objective lens 30, and the remaining light is reflected on the reference plane 31 so that interference light is formed on the back focal plane. Further, the interference light is incident to the angle-resolved spectral image acquiring unit 40, and the angle-resolved spectral image acquiring unit 40 s-polarizes the interference light to acquire an s-polarized interference image (S31-1).

In addition, the angle-resolved spectral image acquiring unit 40 controls the polarization axis of the linear polarizer 13 so as to acquire a p-polarized interference image. In addition, the angle-resolved spectral image acquiring unit 40 p-polarizes the interference light to acquire a p-polarized interference image (S31-2).

In addition, an s-polarized reflectance $R_s$ image according to an incident angle and a wavelength is acquired by applying a low-pass filter to the acquired single s-polarized interference image (S32-1), and a p-polarized reflectance $R_p$ image according to the incident angle and the wavelength is acquired by applying a low-pass filter to the acquired single p-polarized interference image (S32-2). In addition, an s-polarized phase $\Phi_s$ image according to an incident angle and a wavelength is acquired by applying a Fourier technique to the acquired single s-polarized interference image (S33-1), and a p-polarized phase $\Phi_p$ image according to the incident angle and the wavelength is acquired by applying a Fourier technique to the acquired single p-polarized interference image (S33-2).

Then, a reflectance ratio ($\rho=R_p/R_s$) of p-polarized light/s-polarized light according to the incident angle and the wavelength is acquired (S34-1), and a phase difference ($\delta=\Phi_p-\Phi_s$) image of p-polarized light/s-polarized light according to the incident angle and the wavelength is acquired (S34-2).

In addition, after an optimal process is performed to measure the thickness and the refractive index of the multilayer film using the reflectance ratio of p-polarized light/s-polarized light and the phase difference of p-polarized light/s-polarized light according to the incident angle and the wavelength (S35), the thickness and the refractive index of the multilayer film are measured (S36).

FIG. 14 illustrates a flowchart of a method for acquiring a reflectance from a single interference image according to a second exemplary embodiment of the present invention. The method for acquiring the reflectance ratio according to the second exemplary embodiment is the same as that of the aforementioned first exemplary embodiment. That is, before the measuring starts, the light incident to the objective lens 30 is not incident to the measurement object 1 but reflected only to the reference plane 31 by using a beam interrupter between the objective lens 30 and the measurement object 1, so that the angle-resolved spectral image acquiring unit 40 acquires an s-polarized/p-polarized reference light image ($I_o=I_{ref}$) (S41).

In addition, the angle-resolved spectral image acquiring unit 40 acquires an s-polarized/p-polarized interference light ($I_1$) image including reference light (S42). In addition, an s-polarized/p-polarized interference light ($I_2$) image from which the reference light is removed is acquired by Equation 2 described above (S43).

In addition, in Equation 2, an s-polarized/p-polarized measuring reflected light ($I_{sam}$) image may be acquired by applying a low-pass filter (S44). In addition, through the same measurement process for a standard sample, an s-polarized/p-polarized reference reflected light (Ltd) image is acquired (S45), and through the acquired measuring reflected light ($I_{sam}$) and the reference reflected light ($I_{std}$), an s-polarized/p-polarized absolute reflectance ratio ($R_{sam}$) image for the measurement object 1 is calculated by Equation 3 described above (S46).

FIG. 15 illustrates a flowchart of a method for acquiring a phase from a single interference image according to a second exemplary embodiment of the present invention. The method for extracting a phase value according to the second exemplary embodiment is the same as that of the aforementioned first exemplary embodiment.

First, before the measuring starts, the light incident to the objective lens 30 is not incident to the measurement object 1 but reflected only to the reference plane 31 by using a beam interrupter between the objective lens 30 and the measurement object 1, so that the angle-resolved spectral image acquiring unit 40 acquires an s-polarized/p-polarized reference light image ($I_o=I_{ref}$) (S51). In addition, the angle-resolved spectral image acquiring unit 40 acquires an s-polarized/p-polarized interference light ($I_1$) image including reference light (S52). The interference light including the reference light may be represented by Equation 1 described above.

In addition, an s-polarized/p-polarized interference light ($I_2$) image from which the reference light is removed is acquired by Equation 2 described above (S53). In addition, the acquired interference light ($I_2$) image is subjected to a phase signal filtering process through Fourier techniques of Equations 4 and 5 described above (S54).

In addition, as shown in Equation 6 described above, after a phase signal is extracted by an inverse Fourier technique (S55), a phase image is extracted by a logarithmic function and extraction of an imaginary part as shown in Equation 7 described above (S56).

In the above-mentioned first and second exemplary embodiments, the thickness of the thin film is calculated from a single interference pattern by a method of measuring the thickness and refractive index of the thin film by measuring the reflectance ratio and the phase difference of s-polarized light/p-polarized light in real time through a single interference pattern obtained from the spectral image acquiring unit 40, and thus, it is very strong against external vibration and disturbance.

Hereinafter, a configuration, a function, and a measuring method of an apparatus 100 for measuring a thickness and a refractive index of a multilayer thin film using an angle-resolved spectral interference image according to polarization according to a third exemplary embodiment of the present invention will be described. First, FIG. 16 illustrates a block diagram of an apparatus 100 for measuring a thickness and a refractive index of a multilayer thin film using an angle-resolved spectral interference image according to polarization according to a third exemplary embodiment of the present invention. Further, FIG. 17 illustrates an image in a back focal plane of a first angle-resolved spectral image acquiring unit 60 according to the third exemplary embodiment of the present invention. FIG. 18 illustrates an image in a back focal plane of a second angle-resolved spectral image acquiring unit 70 according to the third exemplary embodiment of the present invention.

The measuring device 100 according to the third exemplary embodiment of the present invention is basically the same as the configuration of the first exemplary embodiment described above. However, the measuring device 100 is configured by further including a piezoelectric drive unit 32 which moves the objective lens 30 in an optical axis direction to shift a phase so that the first angle-resolved spectral image acquiring unit 60 acquires many phase-shifted first polarized interference images and the second angle-resolved spectral image acquiring unit 70 acquires many phase-shifted first polarized interference images. Accordingly, many phase-shifted interference patterns are analyzed to extract phases.

The analyzing means measures and analyzes the thickness and the refractive index of the measurement object 1 by acquiring a reflectance of one of the many s-polarized interference images and an s-polarized phase value according to an incident angle and a wavelength after applying a method of compensating a phase-shift amount to the many phase-shifted s-polarized interference images and acquiring a reflectance of one of the many p-polarized interference images and a p-polarized phase value according to an incident angle and a wavelength after applying a method of compensating a phase-shift amount to the many phase-shifted p-polarized interference images. That is, the analyzing means measures and analyzes the thickness and refractive index of the measurement object 1 based on a ratio of the reflectance of the s-polarized interference image and the reflectance of the p-polarized interference image and a phase difference between the s-polarized phase value and the p-polarized phase value.

FIG. 19 is a flowchart of a method for measuring a thickness and a refractive index of a multilayer thin film using an angle-resolved spectral interference image according to polarization according to a third exemplary embodiment of the present invention.

First, as described above, the first angle-resolved spectral image acquiring unit 60 acquires many phase-shifted s-polarized interference images $I_s$ (S61-1) and the second angle-resolved spectral image acquiring unit 70 acquires many phase-shifted p-polarized interference images $I_p$ (S61-2).

In addition, an s-polarized reflectance ($R_s$) image according to an incident angle and a wavelength is acquired by applying a low-pass filter to one s-polarized interference image of the acquired many phase-shifted s-polarized interference images (S62-1), and a p-polarized reflectance ($R_p$) image according to an incident angle and a wavelength is acquired by applying a low-pass filter to one p-polarized interference image of the acquired many phase-shifted p-polarized interference images (S62-2).

In addition, an s-polarized phase $\Phi_s$ image according to an incident angle and a wavelength is acquired after applying a method of compensating a phase-shift amount to the acquired many phase-shifted s-polarized interference images (S63-1), and a p-polarized phase $\Phi_p$ image according to an incident angle and a wavelength is acquired after applying a method of compensating a phase-shift amount to the acquired many phase-shifted p-polarized interference images (S63-2).

Then, a reflectance ratio ($\rho = R_p/R_s$) of p-polarized light/s-polarized light according to the incident angle and the wavelength is acquired (S64-1), and a phase difference ($\delta = \Phi_p - \Phi_s$) image of p-polarized light/s-polarized light according to the incident angle and the wavelength is acquired (S64-2).

After an optimal process is performed to measure the thickness and the refractive index of the multilayer film using the reflectance ratio of p-polarized light/s-polarized light and the phase difference of p-polarized light/s-polarized light according to the incident angle and the wavelength (S65), the thickness and the refractive index of the multilayer film are measured (S66).

FIG. 20 illustrates a flowchart of a method for acquiring a reflectance from a single interference image according to a third exemplary embodiment of the present invention. The acquiring of the reflectance and the reflectance ratio from the single interference image is the same as those of the first and second exemplary embodiments described above. That is, before the measuring starts, the light incident to the objective lens 30 is not incident to the measurement object 1 but reflected only to the reference plane 31 by using a beam interrupter between the objective lens 30 and the measurement object 1, so that the angle-resolved spectral image acquiring units 60 and 70 acquire an s-polarized/p-polarized reference light image ($I_o = I_{ref}$) (S71).

In addition, the angle-resolved spectral image acquiring units 60 and 70 acquire an s-polarized/p-polarized interference light ($I_1$) image including reference light (S72). In addition, an s-polarized/p-polarized interference light ($I_2$) image from which the reference light is removed is acquired by Equation 2 described above (S73).

In addition, in Equation 2, an s-polarized/p-polarized measuring reflected light ($I_{sam}$) image may be acquired by applying a low-pass filter (S74). In addition, through the same measurement process for a standard sample, an s-polarized/p-polarized reference reflected light ($I_{std}$) image is acquired (S75), and through the acquired measuring reflected light ($I_{sam}$) and the reference reflected light ($L_{std}$), an s-polarized/p-polarized absolute reflectance ratio ($R_{sam}$) image for the measurement object 1 is calculated by Equation 3 described above (S76).

In addition, FIG. 21 illustrates a flowchart of a method for acquiring a phase from many interference images according to a third exemplary embodiment of the present invention. As illustrated in FIG. 21, when a phase shift algorithm is applied, a phase value may be more accurately acquired by compensating a phase shift amount through an iterative operation. As illustrated in FIG. 21, first, any initial phase shift value is determined (S82). A phase distribution is calculated based on the phase shift value (S83). In addition, the phase shift value is updated based on the inversely calculated phase distribution (S84).

Then, it is determined whether a difference between the updated phase shift value and the phase shift value before update is equal to or less than a predetermined convergence value (S85), and the operations of steps S83 and S84 are repeated until the difference is equal to or less than the convergence value. The converged phase shift value is finally compensated through the iterative operation (S86).

Hereinafter, a configuration and a function of an apparatus 100 for measuring a thickness and a refractive index of a multilayer thin film using an angle-resolved spectral interference image according to polarization according to a fourth exemplary embodiment of the present invention will be described. First, FIG. 22 illustrates a block diagram of an apparatus 100 for measuring a thickness and a refractive index of a multilayer thin film using an angle-resolved spectral interference image according to polarization according to a fourth exemplary embodiment of the present invention. In addition, FIG. 23 illustrates an image in a back focal plane of an angle-resolved spectral image acquiring unit 40 when a polarization-axial direction of a linear polarizer 13 is vertical to a slit according to the fourth exemplary embodiment of the present invention and FIG. 24 illustrates an image in a back focal plane of the angle-resolved spectral image acquiring unit 40 when the polarization-axial direction of the linear polarizer 13 is parallel with the slit according to the fourth exemplary embodiment of the present invention.

The measuring device 100 according to the fourth exemplary embodiment of the present invention is configured by including the piezoelectric drive unit 32 described in the third exemplary embodiment described above while including the configuration of the second exemplary embodiment described above. Accordingly, like the second exemplary embodiment, by changing a polarization axis of the linear polarizer 13, a single spectral image acquiring unit 40 can acquire an s-polarized interference image and a p-polarized interference image and can acquire many s-polarized interference images and p-polarized interference images which are phase-shifted by the piezoelectric drive unit 32.

That is, a rotation means according to the fourth exemplary embodiment rotates a polarization axis of the linear polarizer 13 so that the angle-resolved spectral image acquiring unit 40 acquires the s-polarized interference image or the p-polarized interference image. In addition, the piezoelectric drive unit 32 moves the objective lens 30 to an optical axis direction to shift the phase, so that the angle-resolved spectral image acquiring unit 40 acquires many phase-shifted s-polarized interference images or the angle-resolved spectral image acquiring unit 40 acquires many phase-shifted p-polarized interference images.

Further, the analyzing means acquires a reflectance of one of the many s-polarized interference images acquired from the angle-resolved spectral image acquiring unit 40 and a first polarized phase value according to an incident angle and a wavelength after applying a method of compensating a phase shift amount to the many phase-shifted s-polarized interference images, and acquires a reflectance of one of the many p-polarized interference images and a p-polarized phase value according to an incident angle and a wavelength after applying a method of compensating a phase shift amount to the many phase-shifted p-polarized interference images. In addition, the analyzing means measures and analyzes the thickness and refractive index of the measurement object 1 based on a ratio of the reflectance of the s-polarized interference image and the reflectance of the p-polarized interference image and a phase difference between the s-polarized phase value and the p-polarized phase value.

FIG. 25 illustrates a flowchart of a method for measuring a thickness and a refractive index of a multilayer thin film using an angle-resolved spectral interference image according to polarization according to a fourth exemplary embodiment of the present invention. First, the angle-resolved spectral image acquiring unit 40 controls a polarization axis of the linear polarizer 13 so as to acquire an s-polarized interference image. In addition, light is emitted from the broad-band light source of the illumination optical module 10, and the first beam splitter 20 reflects some of the light emitted from the illumination optical module 10. Some of the light reflected from the first beam splitter 20 is incident to the measurement object 1 constituted by the multilayer thin film through the objective lens 30, and the remaining light is reflected on the reference plane 31 so that interference light is formed on the back focal plane. Further, the interference light is incident to the angle-resolved spectral image acquiring unit 40, and the angle-resolved spectral image acquiring unit 40 s-polarizes the interference light to acquire an s-polarized interference image and the piezoelectric drive unit 32 moves the objective lens 30 to acquire many phase-shifted s-polarized interference images (S91-1).

In addition, the angle-resolved spectral image acquiring unit 40 controls the polarization axis of the linear polarizer 13 so as to acquire a p-polarized interference image. In addition, the angle-resolved spectral image acquiring unit 40 p-polarizes the interference light to acquire a p-polarized interference image and the piezoelectric drive unit 32 moves the objective lens 30 to acquire many phase-shifted p-polarized interference images (S91-2).

In addition, an s-polarized reflectance ($R_s$) image according to an incident angle and a wavelength is acquired by applying a low-pass filter to one s-polarized interference image of the acquired many phase-shifted s-polarized interference images (S92-1), and a p-polarized reflectance ($R_p$) image according to an incident angle and a wavelength is acquired by applying a low-pass filter to one p-polarized interference image of the acquired many phase-shifted p-polarized interference images (S92-2). In addition, an s-polarized phase $\Phi_s$ image according to an incident angle and a wavelength is acquired after applying a method of compensating a phase-shift amount to the acquired many phase-shifted s-polarized interference images (S93-1), and a p-polarized phase $\Phi_p$ image according to an incident angle and a wavelength is acquired after applying a method of compensating a phase-shift amount to the acquired many phase-shifted p-polarized interference images (S93-2).

Then, a reflectance ratio ($\rho=R_p/R_s$) of p-polarized light/s-polarized light according to the incident angle and the wavelength is acquired (S94-1), and a phase difference ($\delta=\Phi_p-\Phi_s$) image of p-polarized light/s-polarized light according to the incident angle and the wavelength is acquired (S94-2).

In addition, after an optimal process is performed to measure the thickness and the refractive index of the multilayer film using the reflectance ratio of p-polarized light/s-polarized light and the phase difference of p-polarized light/s-polarized light according to the incident angle and the wavelength (S95), the thickness and the refractive index of the multilayer film are measured (S96).

FIG. 26 illustrates a flowchart of a method for acquiring a reflectance from a single interference image according to a fourth exemplary embodiment of the present invention. The method for acquiring the reflectance ratio according to the fourth exemplary embodiment is the same as that of the aforementioned exemplary embodiment. That is, before the measuring starts, the light incident to the objective lens 30 is not incident to the measurement object 1 but reflected only to the reference plane 31 by using a beam interrupter between the objective lens 30 and the measurement object 1, so that the angle-resolved spectral image acquiring unit 40 acquires an s-polarized/p-polarized reference light image ($I_o=I_{ref}$) (S101).

In addition, the angle-resolved spectral image acquiring unit 40 acquires an s-polarized/p-polarized interference light ($I_1$) image including reference light (S102). In addition, an s-polarized/p-polarized interference light ($I_2$) image from which the reference light is removed is acquired by Equation 2 described above (S103).

In addition, in Equation 2, an s-polarized/p-polarized measuring reflected light ($I_{sam}$) image may be acquired by applying a low-pass filter (S104). In addition, through the same measurement process for a standard sample, an s-polarized/p-polarized reference reflected light ($L_{std}$) image is acquired (S105), and through the acquired measuring reflected light ($I_{sam}$) and the reference reflected light ($I_{std}$), an s-polarized/p-polarized absolute reflectance ratio ($R_{sam}$) image for the measurement object 1 is acquired by Equation 3 described above (S106).

FIG. 27 is a flowchart of a method for acquiring phases from many interference images according to a fourth exemplary embodiment of the present invention. The procedure for acquiring the phases from the many interference images according to the fourth exemplary embodiment is the same as that of the third exemplary embodiment described above.

That is, as illustrated in FIG. 27, first, any initial phase shift value is determined (S112). A phase distribution is calculated based on the phase shift value (S113). In addition, the phase shift value is updated based on the inversely calculated phase distribution (S114).

Then, it is determined whether a difference between the updated phase shift value and the phase shift value before update is equal to or less than a predetermined convergence value (S115), and the operations of steps S113 and S114 are repeated until the difference is equal to or less than the convergence value. The converged phase shift value is finally compensated through the iterative operation (S116).

The methods according to the third and fourth exemplary embodiments described above have an advantage of more precisely measuring the phase by extracting the phase from many interference patterns as a method of measuring a reflectance ratio and a phase difference of the s-polarized light and the p-polarized light in real time through many interference patterns phase-shifted in the spectral image acquiring unit.

The invention claimed is:

1. An apparatus for measuring a thickness and a refractive index of a multilayer thin film using an angle-resolved spectral interference image according to polarization in an apparatus for measuring a thickness and a refractive index of a measurement object coated with the multilayer thin film, the apparatus comprising:
    an illumination optical module having a light source emitting light;
    a first beam splitter configured to reflect some of the light emitted from the illumination optical module;
    a linear polarizer provided between the illumination optical module and the first beam splitter;
    an objective lens configured to input some of the light reflected from the first beam splitter to the measurement object constituted by the multilayer thin film and reflect the remaining light to a reference plane to form interference light on a back focal plane;
    a second beam splitter in which interference light where the reflected light incident and reflected to the measurement object interferes with the reflected light reflected from the reference plane is incident, wherein some of the interference light is reflected and the remaining interference light is transmitted;
    a first angle-resolved spectral image acquiring unit configured to receive interference light reflected from the second beam splitter and first-polarize the interference light located in the back focal plane of the objective lens to acquire a first polarized interference image; and
    a second angle-resolved spectral image acquiring unit configured to receive interference light transmitted from the second beam splitter and second-polarize the interference light located in the back focal plane of the objective lens to acquire a second polarized interference image;
    wherein the analyzing means measures and analyzes the thickness and the refractive index of the measurement object based on a ratio of a reflectance of the first polarized interference image and a reflectance of the second polarized interference image, and a phase difference between the first polarized interference image and the second polarized interference image.

2. The apparatus of claim 1, further comprising:
    an analyzing means configured to measure and analyze the thickness and the refractive index of the measurement object from the first polarized interference image acquired from the first angle-resolved spectral image acquiring unit and the second polarized interference image acquired from the second angle-resolved spectral image acquiring unit.

3. The apparatus of claim 1, wherein the second beam splitter may be configured as a polarization beam splitter, wherein the polarization beam splitter easily splits a first polarized interference image and a second polarized interference image in the first angle-resolved spectral image acquiring unit and the second angle-resolved spectral image acquiring unit regardless of a polarization-axial direction of the linear polarizer.

4. A method for measuring a thickness and a refractive index of a multilayer thin film using an angle-resolved spectral interference image according to polarization in a method for measuring a thickness and a refractive index of a measurement object coated with the multilayer thin film, the method comprising the steps of:

emitting light from a broad-band light source of an illumination optical module;

reflecting, by a first beam splitter, some of the light emitted from the illumination optical module;

inputting, by an objective lens, some of light reflected from the first beam splitter to the measurement object constituted by the multilayer thin film and reflecting the remaining light to a reference plane to form interference light in a back focal plane;

receiving the interference light to a second beam splitter, wherein some of the interference light is reflected and the remaining interference light is transmitted;

receiving the interference light reflected from the second beam splitter to a first angle-resolved spectral image acquiring unit side and first-polarizing, by the first angle-resolved spectral image acquiring unit, the interference light to acquire a first polarized interference image and receiving the interference light transmitted from the second beam splitter to a second angle-resolved spectral image acquiring unit side and second-polarizing, by the second angle-resolved spectral image acquiring unit, the interference light to acquire a second polarized interference image; and measuring and analyzing, by an analyzing means, the thickness and the refractive index of the measurement object from the first polarized interference image acquired from the first angle-resolved spectral image acquiring unit and the second polarized interference image acquired from the second angle-resolved spectral image acquiring unit;

acquiring a first polarized reflectance according to an incident angle and a wavelength by applying a low-pass filter to the first polarized interference image and acquiring a second polarized reflectance according to an incident angle and a wavelength by applying a low-pass filter to the second polarized interference image to acquire a reflectance ratio of the first polarized light and the second polarized light;

acquiring a first polarized phase value according to an incident angle and a wavelength by applying a Fourier technique to the first polarized interference image and acquiring a second polarized phase value according to an incident angle and a wavelength by applying a Fourier technique to the second polarized interference image to acquire a phase difference of the first polarized light and the second polarized light; and measuring and analyzing the thickness and the refractive index of the measurement object based on the reflectance ratio and the phase difference.

5. The method of claim 4, wherein the acquiring of the reflectance ratio comprises:

acquiring a first polarized reference light image for reflected light reflected to a reference plane in the first angle-resolved spectral image acquiring unit and acquiring a second polarized reference light image in the second angle-resolved spectral image acquiring unit by using a beam interrupter, before the measuring starts;

acquiring a first polarized interference image including reference light in the first angle-resolved spectral image acquiring unit and acquiring a second polarized interference image including reference light in the second angle-resolved spectral image acquiring unit;

acquiring a first polarized interference image and a second polarized interference image from which the reference light is removed;

acquiring first polarized and second polarized measuring reflected light by applying a low-pass filter to first polarized and second polarized interference light and acquiring first polarized and second polarized reference reflected light with respect to a reference plane; and calculating a first polarized and second polarized absolute reflectance ratio for the measurement object by the acquired measuring reflected light and reference reflected light.

6. The method of claim 4, wherein the step of acquiring of the phase difference comprises the steps of:

acquiring a first polarized reference light image for reflected light reflected to a reference plane in the first angle-resolved spectral image acquiring unit and acquiring a second polarized reference light image in the second angle-resolved spectral image acquiring unit by using a beam interrupter, before the measuring starts;

acquiring a first polarized interference image including reference light in the first angle-resolved spectral image acquiring unit and acquiring a second polarized interference image including reference light in the second angle-resolved spectral image acquiring unit;

acquiring a first polarized interference image and a second polarized interference image from which the reference light is removed;

performing a phase signal filtering process for the first polarized interference image through a Fourier technique, extracting a phase signal through an inverse Fourier technique, and extracting a first polarized phase value through a logarithmic function and extraction of an imaginary part, and performing a phase signal filtering process for the second polarized interference image through a Fourier technique, extracting a phase signal through an inverse Fourier technique, and extracting a second polarized phase value through a logarithmic function and extraction of an imaginary part; and calculating a phase difference between the first polarized phase value and the second polarized phase value.

7. An apparatus for measuring a thickness and a refractive index of a multilayer thin film using an angle-resolved spectral interference image according to polarization in an apparatus for measuring a thickness and a refractive index of a measurement object coated with the multilayer thin film, the apparatus comprising:

an illumination optical module having a light source emitting light;

a beam splitter configured to reflect some of the light emitted from the illumination optical module;

a linear polarizer provided between the illumination optical module and the beam splitter and rotated based on a polarization axis to adjust a polarization direction;

an objective lens configured to input some of the light reflected from the beam splitter to the measurement object constituted by the multilayer thin film and reflect the remaining light to a reference plane to form interference light on a back focal plane;

an angle-resolved spectral image acquiring unit configured to receive the interference light and first-polarize the interference light located in the back focal plane of the objective lens to acquire a first polarized interference image or second-polarize the interference light to acquire a second polarized interference image;

a rotation means configures to rotate a polarization axis of the linear polarizer to acquire a first polarized interference image or a second polarized interference image in the angle-resolved spectral image acquiring unit; and an analyzing means configured to measure and analyze the thickness and the refractive index of the measurement object from a reflectance and a phase value of the first polarized interference image and a reflectance and a phase value of the second polarized interference image acquired from the angle-resolved spectral image acquiring unit;

wherein the analyzing means measures and analyzes the thickness and the refractive index of the measurement object based on a ratio of the reflectance of the first polarized interference image and the reflectance of the second polarized interference image, and a phase difference between the first polarized interference image and the second polarized interference image.

8. A method for measuring a thickness and a refractive index of a multilayer thin film using an angle-resolved spectral interference image according to polarization in a method for measuring a thickness and a refractive index of a measurement object coated with the multilayer thin film, the method comprising the steps of:

controlling a polarization axis of a linear polarizer so that an angle-resolved spectral image acquiring unit acquires a first polarized interference image;

emitting light from a broad-band light source of an illumination optical module and reflecting, by a first beam splitter, some of the light emitted from the illumination optical module;

inputting, by an objective lens, some of the light reflected from the first beam splitter to the measurement object constituted by the multilayer thin film and reflecting the remaining light to a reference plane to form interference light in a back focal plane;

receiving the interference light to the angle-resolved spectral image acquiring unit side and first-polarizing the interference light to acquire a first polarized interference image in the angle-resolved spectral image acquiring unit;

controlling a polarization axis of a linear polarizer so that the angle-resolved spectral image acquiring unit acquires a second polarized interference image;

second-polarizing the interference light to acquire a second polarized interference image in the angle-resolved spectral image acquiring unit; and measuring and analyzing, by an analyzing means, the thickness and the refractive index of the measurement object from a reflectance and a phase value of the first polarized interference image and a reflectance and a phase value of the second polarized interference image acquired from the angle-resolved spectral image acquiring unit;

wherein the measuring and analyzing is to measure and analyze, by the analyzing means, the thickness and the refractive index of the measurement object based on a ratio of the reflectance of the first polarized interference image and the reflectance of the second polarized interference image, and a phase difference between the first polarized interference image and the second polarized interference image.

9. An apparatus for measuring a thickness and a refractive index of a multilayer thin film using an angle-resolved spectral interference image according to polarization in an apparatus for measuring a thickness and a refractive index of a measurement object coated with the multilayer thin film, the apparatus comprising:

an illumination optical module having a light source emitting light;

a first beam splitter configured to reflect some of the light emitted from the illumination optical module;

a linear polarizer provided between the illumination optical module and the first beam splitter;

an objective lens configured to input some of the light reflected from the first beam splitter to the measurement object constituted by the multilayer thin film and reflect the remaining light to a reference plane to form interference light on a back focal plane;

a second beam splitter in which interference light where the reflected light incident and reflected to the measurement object interferes with the reflected light reflected from the reference plane is incident, wherein some of the interference light is reflected and the remaining interference light is transmitted;

a first angle-resolved spectral image acquiring unit configured to receive interference light reflected from the second beam splitter and first-polarize the interference light located in the back focal plane of the objective lens to acquire a first polarized interference image;

a second angle-resolved spectral image acquiring unit configured to receive interference light transmitted from the second beam splitter and second-polarize the interference light located in the back focal plane of the objective lens to acquire a second polarized interference image;

a transfer device configured to move the objective lens in an optical axial direction to shift a phase so that the first angle-resolved spectral image acquiring unit acquires many phase-shifted first polarized interference images and the second angle-resolved spectral image acquiring unit acquires many phase-shifted second polarized interference images; and an analyzing means configured to measure and analyze the thickness and the refractive index of the measurement object by acquiring a reflectance of one of the many first polarized interference images and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images;

wherein the analyzing means measures and analyzes the thickness and the refractive index of the measurement object based on a ratio of the reflectance of the first polarized interference image and the reflectance of the second polarized interference image, and a phase difference between the first polarized phase value and the second polarized phase value.

10. A method for measuring a thickness and a refractive index of a multilayer thin film using an angle-resolved spectral interference image according to polarization in a method for measuring a thickness and a refractive index of a measurement object coated with the multilayer thin film, the method comprising the steps of:

emitting light from a broad-band light source of an illumination optical module;

reflecting, by a first beam splitter, some of the light emitted from the illumination optical module;

inputting, by an objective lens, some of the light reflected from the first beam splitter to the measurement object constituted by the multilayer thin film and reflecting the remaining light to a reference plane to form interference light in a back focal plane;

receiving the interference light to a second beam splitter, wherein some of the interference light is reflected and the remaining interference light is transmitted;

receiving the interference light reflected from the second beam splitter to a first angle-resolved spectral image acquiring unit side and first-polarizing, by the first angle-resolved spectral image acquiring unit, the interference light to acquire a first polarized interference image and receiving the interference light transmitted from the second beam splitter to a second angle-resolved spectral image acquiring unit side and second-polarizing, by the second angle-resolved spectral image acquiring unit, the interference light to acquire a second polarized interference image;

moving, by a transfer device, the objective lens in an optical axial direction to shift a phase so that the first angle-resolved spectral image acquiring unit acquires many phase-shifted first polarized interference images and the second angle-resolved spectral image acquiring unit acquires many phase-shifted second polarized interference images; and measuring and analyzing, by an analyzing means, the thickness and the refractive index of the measurement object by acquiring a reflectance of one of the many first polarized interference images and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images;

wherein the analyzing means measures and analyzes the thickness and the refractive index of the measurement object based on a ratio of the reflectance of the first polarized interference image and the reflectance of the second polarized interference image, and a phase difference between the first polarized phase value and the second polarized phase value.

11. The method of claim 10, wherein the method of compensating the phase shift amount comprises:
a first step of setting any initial phase shift value;
a second step of calculating a phase distribution based on the phase shift value;
a third step of updating a phase shift value based on the calculated phase distribution;
a fourth step of repeating the second and third steps until a difference between the phase shift value and the updated phase shift value is equal to or less than a predetermined convergence value; and
a fifth step of compensating the phase shift value.

12. An apparatus for measuring a thickness and a refractive index of a multilayer thin film using an angle-resolved spectral interference image according to polarization in an apparatus for measuring a thickness and a refractive index of a measurement object coated with the multilayer thin film, the apparatus comprising:
an illumination optical module having a light source emitting light;
a beam splitter configured to reflect some of the light emitted from the illumination optical module;
a linear polarizer provided between the illumination optical module and the beam splitter and rotated based on a polarization axis to adjust a polarization direction;
an objective lens configured to input some of the light reflected from the beam splitter to the measurement object constituted by the multilayer thin film and reflect the remaining light to a reference plane to form interference light on a back focal plane;
an angle-resolved spectral image acquiring unit configured to receive the interference light and first-polarize the interference light located in the back focal plane of the objective lens to acquire a first polarized interference image or second-polarize the interference light to acquire a second polarized interference image;
a rotation means configures to rotate a polarization axis of the linear polarizer to acquire a first polarized interference image or a second polarized interference image in the angle-resolved spectral image acquiring unit;
a transfer device configured to move the objective lens in an optical axial direction to shift a phase so that the angle-resolved spectral image acquiring unit acquires many phase-shifted first polarized interference images, or the angle-resolved spectral image acquiring unit acquires many phase-shifted second polarized interference images; and
an analyzing means configured to measure and analyze the thickness and the refractive index of the measurement object by acquiring a reflectance of one of the many first polarized interference images acquired from the angle-resolved spectral image acquiring unit and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images;
wherein the analyzing means measures and analyzes the thickness and the refractive index of the measurement object based on a ratio of the reflectance of the first polarized interference image and the reflectance of the second polarized interference image, and a phase difference between the first polarized phase value and the second polarized phase value.

13. A method for measuring a thickness and a refractive index of a multilayer thin film using an angle-resolved spectral interference image according to polarization in a method for measuring a thickness and a refractive index of a measurement object coated with the multilayer thin film, the method comprising the steps of:
controlling a polarization axis of a linear polarizer so that an angle-resolved spectral image acquiring unit acquires a first polarized interference image;
emitting light from a broad-band light source of an illumination optical module and reflecting, by a first beam splitter, some of the light emitted from the illumination optical module;
inputting, by an objective lens, some of the light reflected from the first beam splitter to the measurement object constituted by the multilayer thin film and reflecting the remaining light to a reference plane to form interference light in a back focal plane;

receiving the interference light to the angle-resolved spectral image acquiring unit side and first-polarizing the interference light to acquire a first polarized interference image in the angle-resolved spectral image acquiring unit;

moving, by a transfer device, the objective lens in an optical axis direction to shift a phase so that the angle-resolved spectral image acquiring unit acquires many phase-shifted first polarized interference images;

controlling a polarization axis of a linear polarizer so that the angle-resolved spectral image acquiring unit acquires a second polarized interference image;

second-polarizing the interference light to acquire a second polarized interference image in the angle-resolved spectral image acquiring unit;

moving, by the transfer device, the objective lens in an optical axis direction to shift a phase so that the angle-resolved spectral image acquiring unit acquires many phase-shifted second polarized interference images; and measuring and analyzing, by an analyzing means, the thickness and the refractive index of the measurement object by acquiring a reflectance of one of the many first polarized interference images and a first polarized phase value according to an incident angle and a wavelength after applying a method of compensating a phase shift amount to the many phase-shifted first polarized interference images and acquiring a reflectance of one of the many second polarized interference images and a second polarized phase value according to an incident angle and a wavelength after applying a method of compensating a phase shift amount to the many phase-shifted second polarized interference images;

wherein the analyzing means measures and analyzes the thickness and the refractive index of the measurement object based on a ratio of the reflectance of the first polarized interference image and the reflectance of the second polarized interference image, and a phase difference between the first polarized phase value and the second polarized phase value.

* * * * *